(12) United States Patent
Simon et al.

(10) Patent No.: US 9,694,907 B2
(45) Date of Patent: Jul. 4, 2017

(54) LIFT-GENERATING DEVICE HAVING AXIAL FAN(S), AND HEAVIER-THAN-AIR AIRCRAFT FITTED WITH SUCH A DEVICE

(71) Applicant: HUTCHINSON, Paris (FR)

(72) Inventors: Jean-Michel Simon, Chatillon (FR); Sébastien Andre, Villemandeur (FR); Christophe Dominiak, Varennes-changy (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 14/904,597

(22) PCT Filed: Jul. 3, 2014

(86) PCT No.: PCT/FR2014/051708
§ 371 (c)(1),
(2) Date: Jan. 12, 2016

(87) PCT Pub. No.: WO2015/004370
PCT Pub. Date: Jan. 15, 2015

(65) Prior Publication Data
US 2016/0152333 A1 Jun. 2, 2016

(30) Foreign Application Priority Data

Jul. 12, 2013 (FR) .................................. 13 56853

(51) Int. Cl.
*B64C 29/00* (2006.01)

(52) U.S. Cl.
CPC ................. *B64C 29/0025* (2013.01)

(58) Field of Classification Search
USPC .............. 244/23 B, 7 R, 6, 23 A, 45 R, 39
See application file for complete search history.

(56) References Cited

U.S. PATENT DOCUMENTS

| 3,387,456 A | * | 6/1968 | Feder | ................. B64C 29/0091 244/23 B |
| 3,388,878 A | * | 6/1968 | Peterson | ............ B64C 29/0033 244/12.3 |

(Continued)

FOREIGN PATENT DOCUMENTS

| GB | 951 186 A | 3/1964 |
| GB | 2 321 227 | 7/1998 |

(Continued)

OTHER PUBLICATIONS

PCT International Search Report for PCT/FR2014/051708, mailed Oct. 17, 2014, 4 pgs.

(Continued)

*Primary Examiner* — Christopher P Ellis
(74) *Attorney, Agent, or Firm* — Patterson Thuente Pedersen, P.A.

(57) ABSTRACT

The invention relates to a device which includes two longitudinal deflecting surfaces or two pluralities of longitudinal deflecting surfaces, which are symmetrical on either side of the plane formed by the roll and yaw axes of the device and substantially in line with the roll axis and parallel to same, an air flow generator including at least one axial fan suctioning ambient air by means of at least one propeller faired in a flow path and, downstream of said propeller, an air distributor-diffuser, consisting of two adjacent semi-distributors each defining a curved duct directing the air to an outlet opening and toward the longitudinal deflecting surface or plurality of longitudinal deflecting surfaces.

37 Claims, 17 Drawing Sheets

(56) References Cited

U.S. PATENT DOCUMENTS

| | | | | |
|---|---|---|---|---|
| 4,537,372 A * | 8/1985 | Forizs | ................ | B64C 29/0033 |
| | | | | 244/12.4 |
| 5,407,150 A | 4/1995 | Sadleir | | |
| 5,890,441 A * | 4/1999 | Swinson | ............ | B64C 29/0025 |
| | | | | 244/12.1 |
| 6,883,748 B2 * | 4/2005 | Yoeli | ........................ | B60V 1/06 |
| | | | | 244/118.1 |
| 2003/0098388 A1 * | 5/2003 | Walmsley | ............... | B64C 27/20 |
| | | | | 244/12.2 |
| 2007/0200027 A1 | 8/2007 | Johnson | | |
| 2012/0237341 A1 | 9/2012 | Simon | | |
| 2015/0274289 A1 * | 10/2015 | Newman | ................ | B64C 27/26 |
| | | | | 244/12.4 |

FOREIGN PATENT DOCUMENTS

| | | |
|---|---|---|
| WO | WO 92/01603 A1 | 2/1992 |
| WO | WO 2010/116362 A1 | 10/2010 |
| WO | WO 2011/067527 A1 | 6/2011 |

OTHER PUBLICATIONS

English translation of PCT International Search Report with English translation for PCT/FR2014/051708, mailed Oct. 17, 2014, 2 pgs.
PCT Written Opinion of the International Searching Authority for PCT/FR2014/051708, 6 pages.
English translation of PCT Written Opinion of the International Searching Authority for PCT/FR2014/051708, 6 pages.

\* cited by examiner

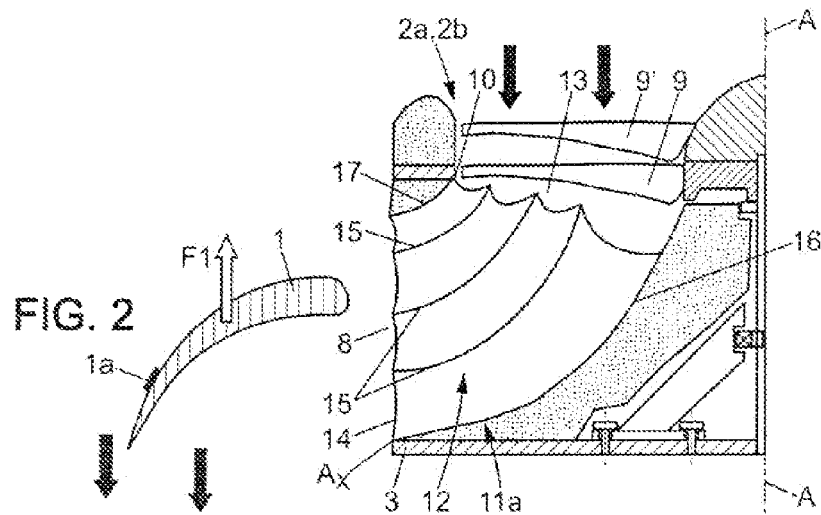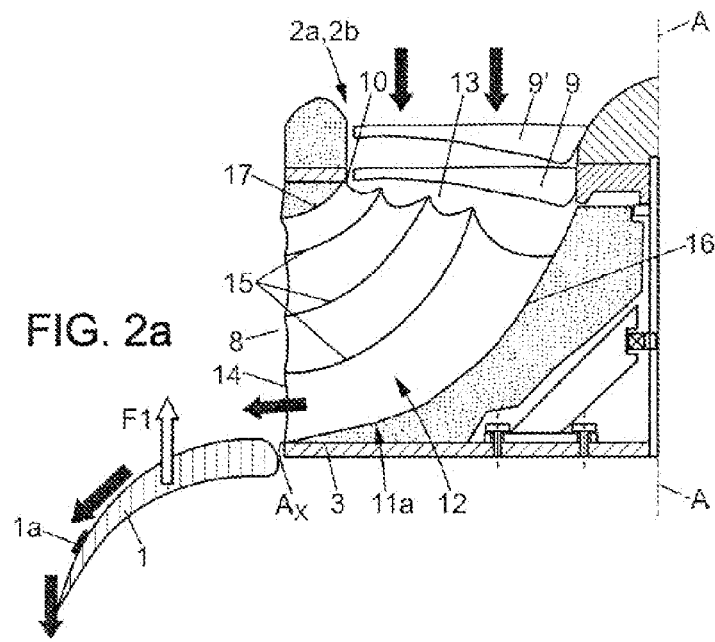

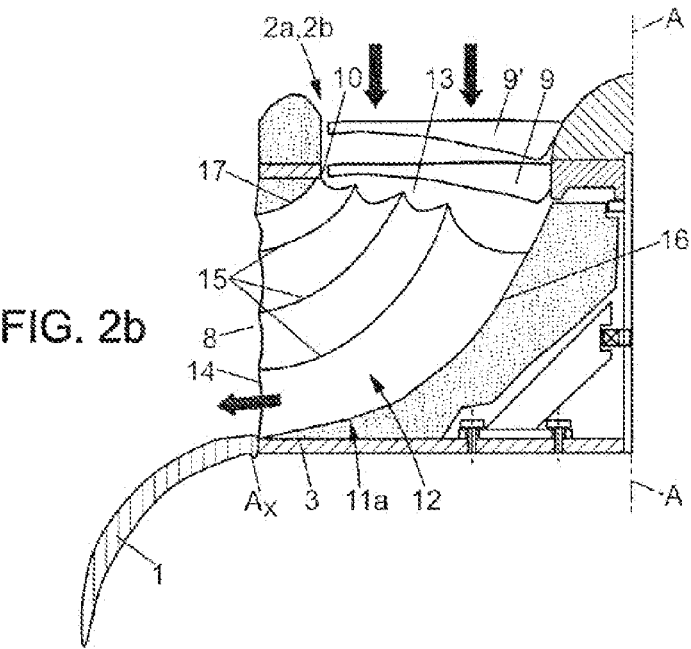
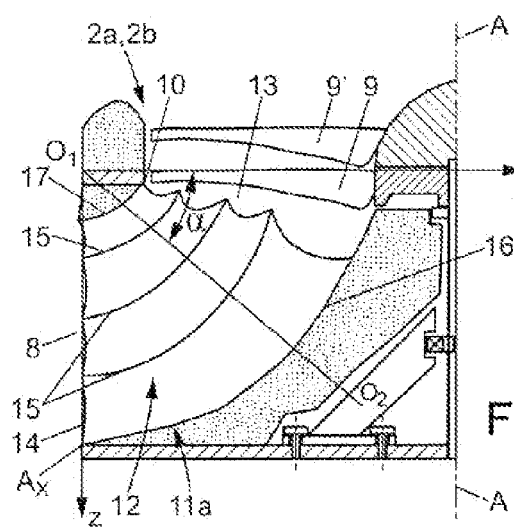

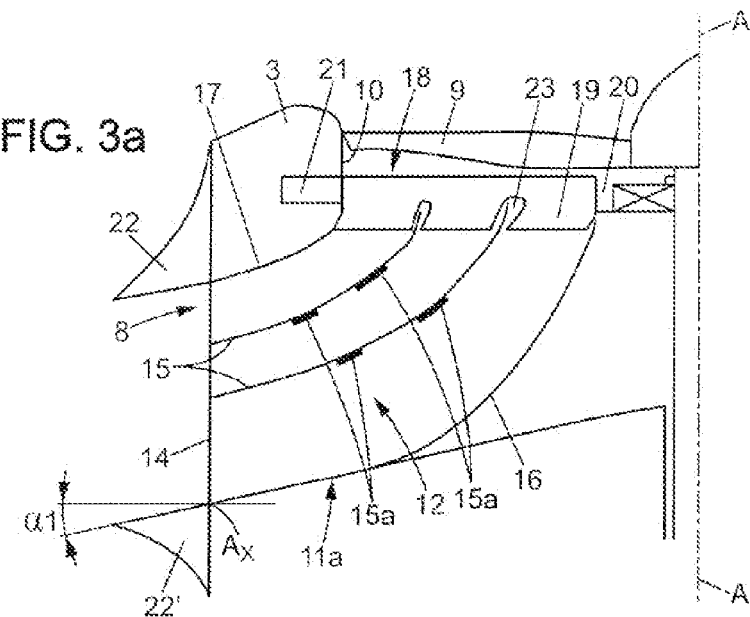
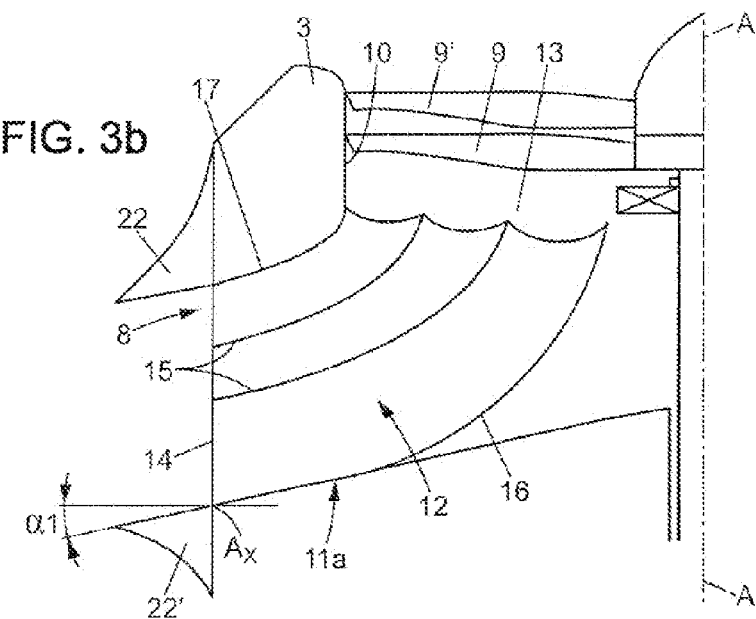

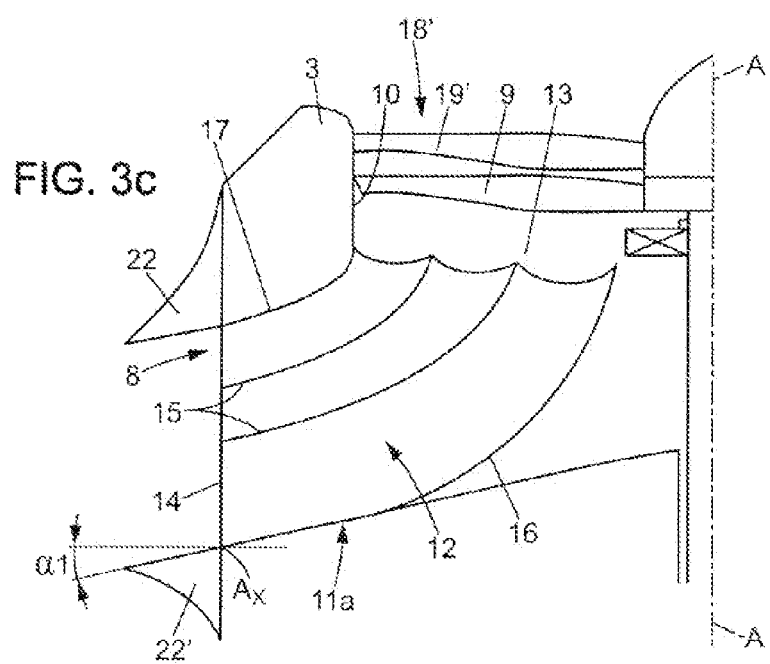

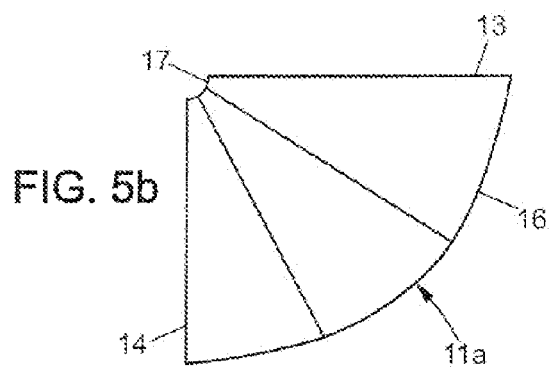
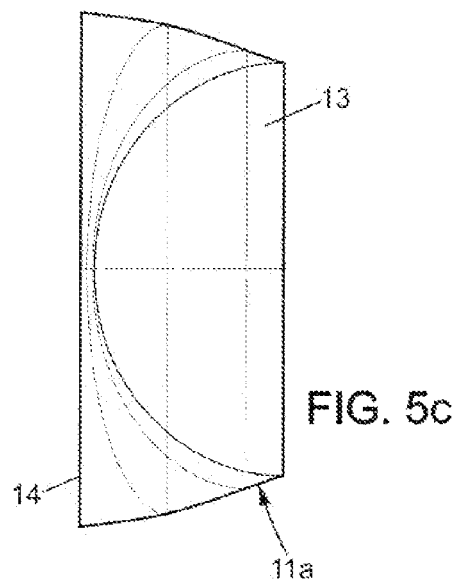
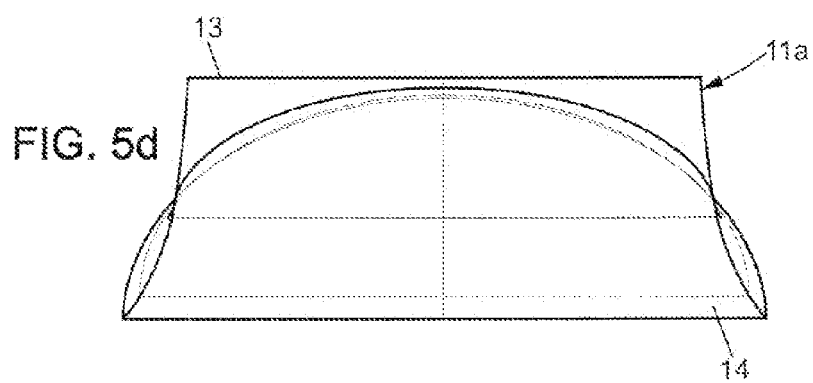

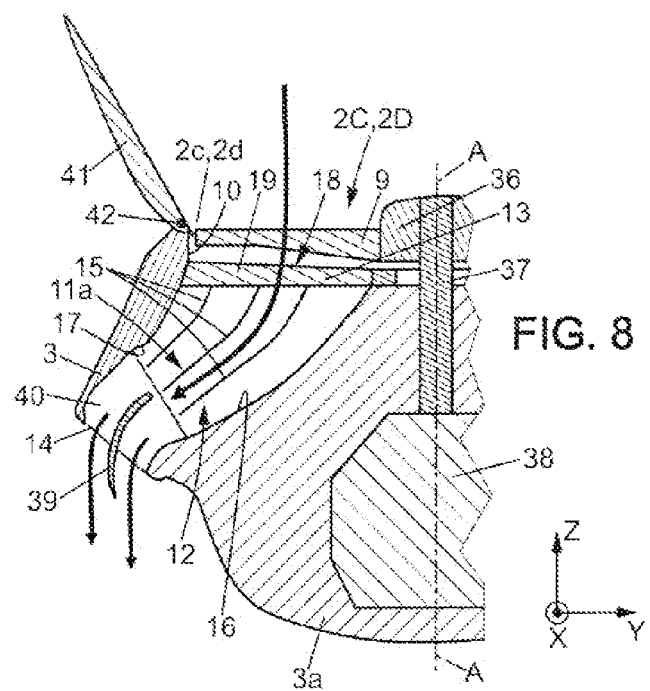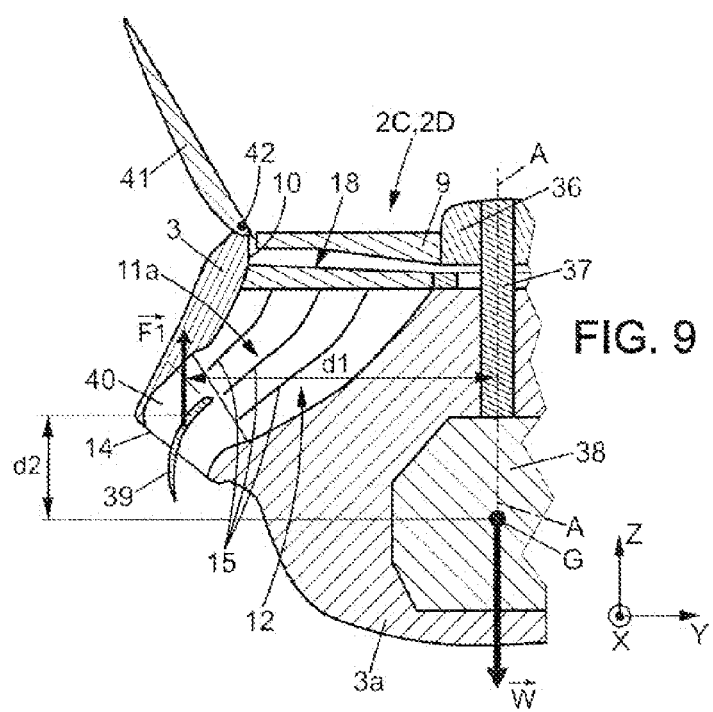

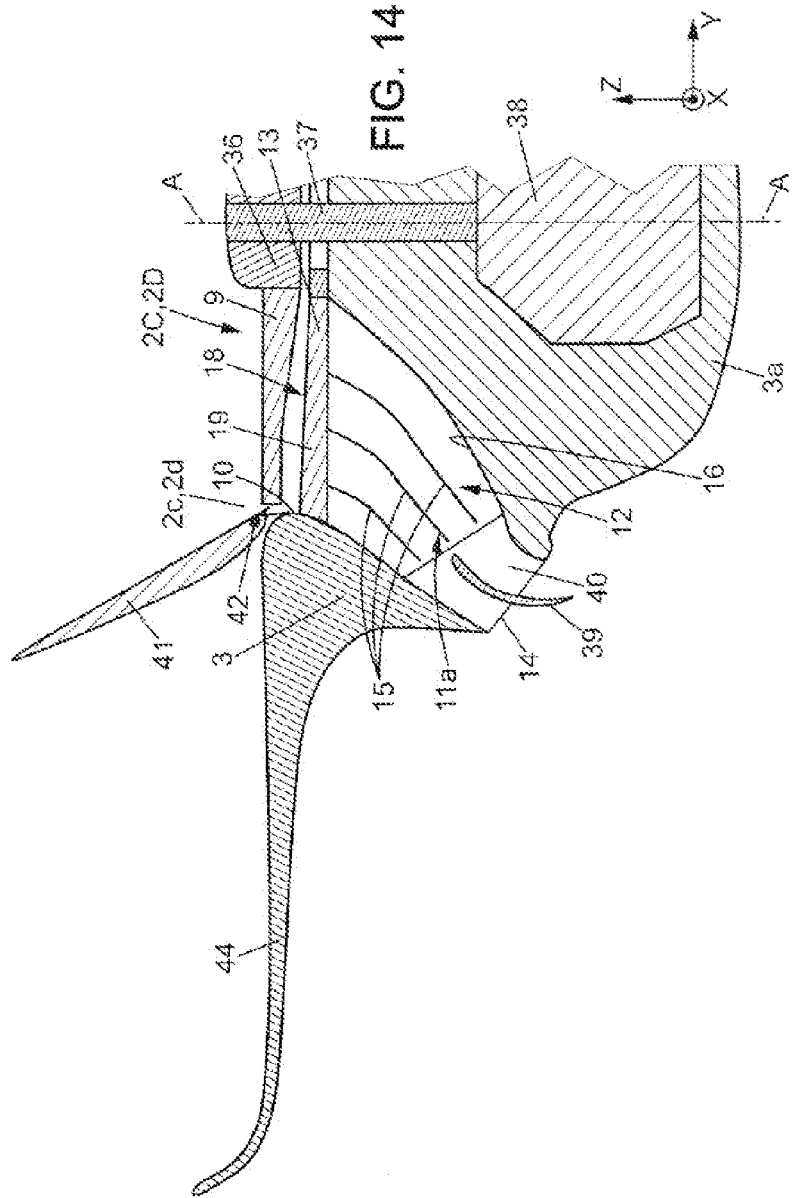

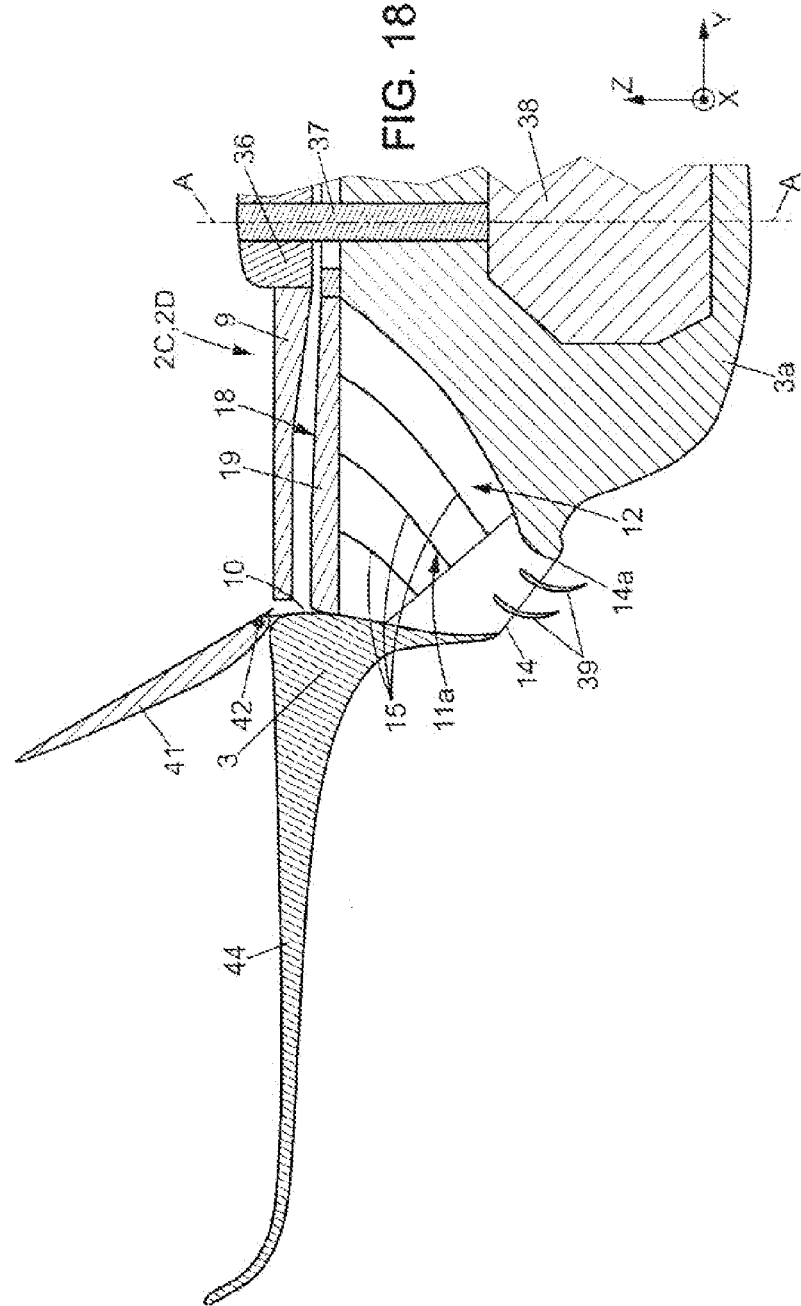

LIFT-GENERATING DEVICE HAVING AXIAL FAN(S), AND HEAVIER-THAN-AIR AIRCRAFT FITTED WITH SUCH A DEVICE

RELATED APPLICATIONS

The present application is a National Phase entry of PCT Application No. PCT/FR2014/051708, filed Jul. 3, 2014, which claims priority from FR Patent Application No. 1356853, filed Jul. 12, 2013, said applications being hereby incorporated by reference herein in their entirety.

FIELD OF THE INVENTION

The invention relates to a lift-generating device and a heavier-than-air aircraft fitted with such a device, allowing the heavier-than-air aircraft to take off and land vertically or over short distances (heavier-than-air aircraft known as V/STOL, the acronym for the expression Vertical/Short Take-Off and Landing), as well as being able to move in all directions in flight.

BACKGROUND OF THE INVENTION

V/STOL heavier-than-air aircraft are known from GB 951 186 and GB 2 321 227 are fitted with lift-generating devices using the lift-generating effect obtained by blowing the majority of an air flow produced by an air flow generator over deflecting surfaces that are lift-generating aerofoils, linked to a load-bearing structure of the device, and therefore also of the heavier-than-air aircraft, the device comprising two longitudinal deflecting surfaces or pluralities of surfaces, arranged on either side of the roll axis of the device and extending substantially parallel with the roll axis of the device, the two longitudinal deflecting surfaces or pluralities of surfaces being symmetrical with one another with respect to the plane defined by the roll and yaw axes of the device. In this manner, the force of resistance to forward movement (aerodynamic drag) of these longitudinal aerofoils is minimized when the device moves horizontally in the direction of its roll axis, which is its main axis, i.e. in cruising flight.

WO 2011/067527 proposes a lift-generating device of this type, with the aim of providing an improved transportation capacity for an equivalent engine power, with respect to heavier-than-air aircraft with faired propellers, a capacity for generating a significant lift by maximizing the blown air flow with respect to the size and weight of the load-bearing structure, and a small penalty on the translation drag in flight or horizontal cruising flight (flight in aeroplane mode) taking account of the arrangement of the device proposed in this patent document.

Moreover, this device makes it possible to ensure that a heavier-than-air aircraft fitted therewith has excellent stability in vertical flight and in the transition phase between vertical flight and cruising flight, due to the fact that the centres of lift of the lateral aerofoils are spaced as far apart as possible within the limits of the aircraft, thus making it possible to have a powerful roll righting moment, but also a powerful pitch righting moment, as the aerofoils extend over the majority of the length of the aircraft, i.e. over more than 50% to 100% of this length. In addition, the centre of gravity of the heavier-than-air aircraft can easily be situated below the centres of lift of the longitudinal aerofoils and between said centres of lift, when the engine or engines and the cabin of the heavier-than-air aircraft are placed below the wing plane, defined by the longitudinal aerofoils and/or additional transverse aerofoils, if applicable, which provide the lift in cruising flight.

To this end, the proposed device uses aerofoils, preferably, but not necessarily, with high lift, and known as super high-lift aerofoils, subject to at least one air flow generated by at least one large-diameter fan, and therefore in this way has blown wings, and arranged so that said aerofoils provide a resistance to forward motion that is very low when the heavier-than-air aircraft is in horizontal cruising flight. With respect to the air flow generator of the device, according to WO 2011/067527, it can comprise at least one fan mounted in the load-bearing structure and centred on the roll axis, and preferably two fans spaced along said roll axis, including at least one radial fan, with an axis substantially parallel with the yaw axis, preferably arranged towards the front of said structure, or an axial fan, also with an axis substantially parallel with the yaw axis but which can be inclined by an angle of less than 30° to the yaw axis, preferably placed towards the rear of the structure, each fan drawing air through a feed opening arranged in the upper face of the structure, and the outlet air flow from each fan being distributed essentially to lateral blow vents on the longitudinal aerofoils and arranged in the sides of the load-bearing structure via radially disposed channels over at least a portion of their extent, and separated from one another by partitions for channeling the air flow which have generatrices parallel with the yaw axis.

Whether the fan is radial, with blades inclined rearwards with respect to the direction of rotation of the fan, and each pivotable and controlled in rotation about an axis substantially parallel with the axis of rotation of the fan, the blades being associated with a fixed diffuser with vanes, each vane of which is also pivotable and the orientation of which is controlled about a pivot axis parallel with that of the fan blades, or whether the fan is of an axial type, the configuration according to which the outlet flows of the fans are distributed by channels with vertical walls arranged in the load-bearing structure and laterally curved so as to open out laterally via blow vents in the longitudinal aerofoils, with a radial arrangement of the partitions delimiting the channels in order to channel the air flow leaving a fan, is not an optimal configuration either from the point of view of the space requirement, and therefore the aerodynamic drag, or for the pressure losses, and therefore for the propulsive efficiency, in particular for an axial fan that must generate a significant air flow that is discharged laterally over the longitudinal aerofoils. Flaps, optionally arranged in grids, and inclined about axes parallel with the roll or yaw axis, and arranged in lateral vents, make it possible to set the angle of attack of the blown aerofoils and/or to give the blown air flow a longitudinal velocity component. But this activated air flow, at the outlet of a radial fan, having a substantially radial velocity, and guided by channels with vertical walls, is in no way guided, inside the volume of the load-bearing structure, by these flaps in such a way as to adopt a lateral orientation, and even less so starting from an outlet flow of an axial fan having a circumferential rotational velocity component.

A VTOL heavier-than-air aircraft is also known from WO 92/01603 or U.S. Pat. No. 5,407,150 that has a lift generator using downward direction of substantially radial jets, optionally inclined downward at the outlet of a single fan mounted in the centre of the fuselage, so as to exert an upward thrust by reaction on the structure of the heavier-than-air aircraft, by means of ducts for channeling the jets, which are angled outwards and downwards so that the air leaving the downstream end of each duct is in a jet having substantially the same cross-section as the duct at its downstream end.

As an alternative, two fans are installed symmetrically to one another in the two wings of the heavier-than-air aircraft and are through-mounted fans with annular jets, which pass through the corresponding wing from top to bottom, being provided with channels by means of annular partitions that are slightly downwardly divergent. The generatrices of the deflecting surfaces are, at least at the start, either perpendicular to the radius, with respect to the axis of rotation of the fan in question, or have a non-specified orientation, but which can only be substantially perpendicular to the radius or substantially tangential, optionally in association with the downward outlet vents in a generally angular form, each of the two sides of which is both inclined very substantially on the roll axis and the pitch axis. In all cases, the air flow, which originates from a single-stage fan, is not "rectified", that is to say not oriented substantially parallel with the axis of rotation of the fan, and therefore has a circumferential rotational velocity component, as in any flow behind a single propeller. This patent document does not propose any air flow outlet vent that is elongated and parallel with the roll axis.

In order to provide attitude control, concentric deflecting partitions can be arranged to deflect fractions of the lift-generating flow in particular directions, that may be opposite at different times, but these partitions together do not share one half of the lift-generating flow originating vertically from the fan or fans on the same side of the roll axis of the heavier-than-air aircraft. Moreover, the whole surface of the central portion of the load-bearing structure, forming the fuselage as well as the wings, cannot be used optimally, as a result of the unsuitable choice of air outlets that are distributed circularly, or hexagonally, or "in a square" which does not make it possible to ensure the longitudinal or even traverse continuity of a space reserved for the payload. In addition, in the configuration for the transition from vertical flight to cruising flight, the aerodynamics of the central portion of the load-bearing structure (wing and/or fuselage) is adversely affected by the presence of air flow outlets (see FIGS. 6, 7 and 8), which means that, during this phase, the lift is provided by the thrust of the fan and the lift of the outer portion of the wings, outside the area of influence of the fan outlet, therefore the central and enlarged portion of the load-bearing structure does not contribute to satisfactory aerodynamics in this configuration. Nor does this central portion contribute substantially when the aircraft is in the cruising flight situation, since a speed has necessarily been reached in which the lift of the external wings is sufficient to bear the aircraft. The central portion therefore serves no useful purpose in this phase either, and it even constitutes a source of aerodynamic losses that is significant at high speed.

SUMMARY OF THE INVENTION

The purpose of the present invention is therefore to propose a lift-generating device and a heavier-than-air aircraft fitted with such a device, such as are known from WO 2011/067527, and which achieve qualitatively and/or quantitatively improved performance in terms of aerodynamics, in order to achieve greater speeds of travel and transportation capacity, and/or to accept significantly larger payloads.

To this end, the lift-generating device according to the invention, of the type known from WO 2011/067527 and as presented above, is such that its air flow generator comprises at least two axial fans the axes of which are substantially parallel with the yaw axis, and mutually offset on the roll axis, said axial fans being mounted in the load-bearing structure, and each drawing ambient air via a respective intake opening arranged in the upper face of the load-bearing structure, using at least one multi-blade rotor driven in rotation about the axis of the corresponding fan and faired in a flow path having a circular cross-section extending said inlet opening towards the inside of said load-bearing structure, and characterized in that said at least two axial fans each comprise at least two stages having pluralities of blades or vanes, one of which is said multi-blade rotor mobile in rotation about the corresponding axis, and in that it comprises downstream of each of said at least two axial fans, an air distributor-diffuser, consisting of two adjacent semi-distributors, symmetrical with one another with respect to the plane defined by the axis of the corresponding axial fan and the roll axis, each semi-distributor delimiting a curved duct having an inlet opening receiving one of the two halves of the air flow at the outlet of the corresponding axial fan, on the side of respectively one of the two longitudinal deflecting surfaces or pluralities of surfaces, and guiding the air which passes through said curved duct to an outlet opening incorporated in respectively one of the two lateral faces of said load-bearing structure by means of a plurality of channels extending at least over a portion of the length of said curved duct and delimited by deflecting partitions formed by generatrices parallel with the roll axis, and towards the longitudinal deflecting surface or plurality of surfaces situated on the same side as said semi-distributor, so that the air flow taken in by each axial fan is divided into two halves, the majority of each of which is laterally blown over respectively one of the two longitudinal deflecting surfaces or pluralities of surfaces.

Moreover, the device according to the invention can comprise successively, from the front to the rear of said load-bearing structure, and centred in a plane of symmetry defined by the roll and yaw axes of the device, a series of said at least two axial fans each cooperating with an air distributor-diffuser, followed and/or preceded by at least one axial fan with an axial flow outlet, the flow of which passes through said load-bearing structure from top to bottom. Advantageously, said axial fan with an axial flow outlet has its axis parallel with said yaw axis and has an outlet section situated in the vertical extension of its inlet section, with a ratio between the outlet section and the inlet section that is greater than 1, and preferably, comprised between 1.1 and 1.3.

In this variant of the device, in order to promote the balancing of the attitude of the device in particular, it is advantageous for at least one axial fan, preferably at the axial flow outlet, to be fitted with a least one rotor or propeller having variable-pitch adjustable blades, and driven in rotation at a constant nominal speed. In fact, if in addition all the axial fans are driven by a drive system with fixed drive ratios, the thrust of at least one axial fan with variable-pitch rotor or propeller, preferably with an axial outlet, is adjustable by controlling the pitch, in order to advantageously contribute to balancing the attitude of the device.

In the different embodiments of the device presented above, advantageously the air flow generated by each axial fan associated with an air distributor-diffuser is directed from each side of said load-bearing structure with an outward angular orientation, the angle between the direction of said flow and a plane defined by said roll and yaw axes of the device being situated between 5° and 20°, and preferably, between 8° and 12°, so as to considerably reduce the ground effect on the structure of the heavier-than-air aircraft and provide it with a stabilizing effect. Also advantageously, in order to optimize the front section of a heavier-than-air aircraft fitted with this device, the radius of at least one axial fan associated with an air distributor-diffuser is greater than the distance between the low point of the outlet section of the air flow of said distributor-diffuser, and the median plane of symmetry of the device, defined by the roll and yaw axes of the device.

Advantageously, at least one portion of said longitudinal deflecting surfaces or pluralities of surfaces extends longitudinally in a manner substantially parallel to the roll axis over a length greater than or equal to the sum of the diameters of said fans associated with air distributor-diffusers.

Thus, the longitudinal deflecting surfaces extend over the majority of the length of said load-bearing structure in its length bearing the fans, i.e. laterally opposite said fans and over a length which is greater than or equal to the sum of the diameters of said fans. That is to say that the longitudinal deflecting surfaces have a portion at least substantially parallel with the roll axis, the length of which is greater than or equal to the cumulative length of the diameters of the fans.

Also advantageously, in order to obtain, directly downstream of at least one axial fan cooperating with an air distributor-diffuser, an air flow that is favourably oriented with respect to the axis of said axial fan, and substantially parallel with this axis, said at least one axial fan comprises two multi-blade rotors that are coaxial and contra-rotating about their common axis, which also makes it possible to avoid or at least to reduce any unwanted counter torque due to the rotation of a single rotor of the fan, and/or to increase the efficiency of the fan.

With the same aim of favourably orienting the air flow leaving at least one axial fan, alternatively, said axial fan is such that a flow rectifier is mounted between said at least one multi-blade rotor and said air distributor-diffuser, said rectifier including a plurality of fixed vanes, which rectify the air flow at the outlet of said fan substantially parallel with the axis of said axial fan, the fixed vanes extending radially between an annular hub passed through by at least a drive shaft of said at least one multi-blade rotor, and a circular peripheral rim, coaxial with the annular hub about the axis of said fan and fixed to said load-bearing structure.

Also alternatively, it is possible, in order to rectify the flow of at least one axial fan with air distributor-diffuser, to install a flow distributor-deflector upstream, above said at least one multi-blade rotor, said flow distributor-deflector including a plurality of radial fixed vanes, which deflect the air flow at the inlet of said axial fan so that the sums of the deflected flows due to the presence of said distributor-deflector and of said at least one multi-blade rotor are substantially zero to allow the air flow to have an orientation substantially parallel with the axis of said axial fan at the outlet thereof.

In order to improve the efficiency of the distributor-diffuser in its distribution and deflection of the air flow downstream of a corresponding axial fan into two half-flows oriented essentially laterally in directions substantially opposite to one another, it is advantageous that on each half-distributor, said deflecting partitions are curved and have their concavity facing mainly upwards and outwards from the side of said load-bearing structure where said corresponding curved duct extends.

In order to minimize the pressure losses and ensure a beneficial effect on the thrust provided by said at least two fans each associated with an air distributor-deflector, it is advantageous for the area of the cross-section of the curved duct, perpendicular to the local direction of flow of the air in said curved duct, to be substantially constant or continuously increasing so that the ratio of the area of the section of the outlet opening of said curved duct to the area of the section of the inlet opening of this same curved duct is comprised between substantially 1 and substantially 2, and preferably, between 1 and 1.2.

Moreover, in order to optimize the supply of lateral blown air of each longitudinal deflecting surface or plurality of surfaces, on a side corresponding to the load-bearing structure, the shape of the cross-section of said curved duct advantageously develops progressively from a semi-circular shape at the inlet opening, in a plane substantially perpendicular to the axis of the corresponding fan, to an ovoid or flattened shape in a direction substantially parallel with the roll axis, at the outlet opening, in a plane substantially parallel with the axis of said fan or inclined on the axis of said fan.

In particular, the shape of the outlet opening of the curved duct can advantageously be rectangular or almost rectangular.

As a variant, said curved duct can be constituted, between its semi-circular inlet opening and its outlet opening, by a curved upstream portion the cross-sections of which are substantially semi-elliptical, and comprising the plurality of deflecting partitions guiding the air flow passing through said duct, and a downstream portion, without a deflecting partition, and substantially straight between the last, substantially semi-elliptical section of said upstream portion and said outlet opening.

In a first embodiment of the invention, the two longitudinal deflecting surfaces or plurality of surfaces are, as in WO 2011/067527, longitudinal lift-generating aerofoils fixed laterally to the outside of the load-bearing structure and each facing the outlet opening of the curved duct of respectively one of the two semi-distributors of each of said axial fans associated with an air distributor-diffuser, so that the air flow passing through said curved duct is blown, in its majority, i.e. more than 50% and capable of reaching 100% of this air flow, over a facing longitudinal aerofoil, which delivers a lift transmitted to the load-bearing structure.

In this embodiment, the optimization of the geometry of each curved duct is more advantageously ensured if the shape of the cross-sections of said curved duct develops progressively, starting from the semi-circular inlet opening, in semi-ellipses elongated along their long axis which is parallel with the roll axis, to a semi-ellipse of longer axis at the outlet opening.

In the latter case, a particularly efficient dimensioning of each semi-distributor is such that the long axis of the semi-ellipse of the outlet opening is comprised substantially between 1.2D and 1.5D, where D is the diameter of the cross-section of the inlet opening.

In an embodiment with which excellent results have been obtained by simulation/modelling, the long axis of the semi-elliptical section of the curved duct develops progressively between D at the inlet opening and 1.3D at the outlet opening, while the short axis of said semi-elliptical section develops progressively between D and 0.77 D, the development taking place along two curves of development of the values of the long and short axes on the y-axis as a function of an angle between the plane of the inlet opening and the plane of the cross-section in question, which varies between 0° and 90°, on the x-axis, said two curves having horizontal tangents at both ends, for α=0° and α=90°, and a point of inflexion between said ends of the curves.

Thus it can be ensured that the air flows are indeed perpendicular to the flow sections of the curved duct of each semi-distributor, both at the inlet and at the outlet.

Moreover, it is advantageous for the outlet opening of the curved duct to open out at the level of the blow vents arranged in a longitudinal side of the load-bearing structure facing a longitudinal aerofoil.

In addition, streamlined ribs with a cross-section in the shape of a wedge advantageously extend along at least one of the upper and lower edges of said blow vents of the longitudinal aerofoils and project towards said aerofoils so as to draw ambient air through the lateral outlet of the blow flow via the vents and dilute said flow, while reducing the pressure losses at the outlet of the vents.

Still with the aim of optimizing the geometry of the curved ducts and obtaining a reduction in the pressure losses, it is advantageous for the outlet flow from the vents to be inclined downwards, with respect to a plane perpendicular to the axis of said fan, by an angle α1 comprised between 0° and approximately 60°.

As a variant, each of the longitudinal aerofoils can be constituted by a longitudinal wing the leading edge of which is immediately adjacent to the lower edge of the blow vents or continuing on from the lower edge of the blow vents in the corresponding longitudinal side of the load-bearing structure, so as to blow over the upper surface of said longitudinal wing and generate a Coandă effect lift.

In order to make the curved ducts lighter and easier to produce, each curved duct can advantageously comprise a cloth or fabric sheath of the type used to make the canopies of powered hang gliders or other ultra-light motorized aircraft known as ULM, the sheath being shaped by composite stiffeners in the form of battens, forming a sheath inlet frame with a semi-circular hoop, a sheath outlet frame, substantially rectangular in shape, curved stiffeners connected to the inlet and outlet frames and oriented in the direction of the air flow passing through the curved duct, and at least one curved deflecting partition defined by generatrices parallel with the roll axis.

In a second embodiment of the invention, the two longitudinal deflecting surfaces or pluralities of surfaces can be deflecting vanes, preferably aerodynamically profiled, mounted at least partially inside the curved ducts of the semi-distributors, downstream of the deflecting partitions, said deflecting vanes being defined by generatrices parallel with the roll axis, curved and having their concavity facing downwards and inwards, on the side of the load-bearing structure, so as to deflect the air flows passing through the curved ducts downwards, in order to generate a lift force on the load-bearing structure by reaction.

Advantageously, for better balance and better pilotability of a heavier-than-air aircraft fitted with such a device, the curved ducts, partitions and curved deflecting vanes are arranged and dimensioned so that the majority of each half-flow of each corresponding fan, i.e. more than 50% to 100% of this half-flow, is laterally deflected with respect to the roll axis, by a distance greater than or equal to the radius of said fan.

In a first embodiment according to this mode of implementation of the invention, a longitudinal deflecting vane is associated with the curved ducts of the semi-distributors that are on the same side of the load-bearing structure, an upstream portion of said deflecting vane being engaged inside an outlet manifold common to all the curved ducts on said same side, downstream of the deflecting partitions, and a downstream portion of said deflecting vane projecting outside said outlet manifold and oriented substantially downwards.

According to a second embodiment of the second mode of implementation of the invention, a plurality of longitudinal deflecting vanes, spaced apart and offset from one another respectively from the outside in and from top to bottom with respect to the load-bearing structure, is associated with the curved ducts of the semi-distributors that are on the same side of the load-bearing structure, and preferably totally engaged inside an outlet manifold common to all the curved ducts on said same side, downstream of the deflecting partitions, substantially from the outlet end of said manifold in which the downstream ends of said vanes are substantially arranged.

So as to reduce the drag in cruising flight of a heavier-than-air aircraft fitted with such a device, in the two aforementioned embodiments it is advantageous for at least one longitudinal deflecting vane to be pivotably mounted about at least one longitudinal axis, substantially parallel with the roll axis, between two end positions, one of which is an operating position, in which the air flow passing through the corresponding curved ducts is deflected downwards, and a closed position of the outlet opening of said curved ducts, or of a common outlet manifold, for cruising flight.

However, in the various aforementioned embodiments, in order to reduce the drag in cruising flight very substantially, even when the heavier-than-air aircraft benefits from high installed fan power, the diameter of said fans, parallel with the pitch axis, extends over the majority of the width of the load-bearing structure, and is preferably more than 80% of said width.

Advantageously, in order improve the quality of the flow in the area including the partitions of the semi-distributors, and thus reduce the pressure losses in this area, or in order to increase the lift of the longitudinal aerofoils, membrane strips vibrating by self-excitation or by an active device are arranged parallel with the roll axis over the upper surface of said deflecting partitions and/or over the upper surface of said deflecting surfaces so as to reduce the turbulence of the air flow during its passage over the deflecting partitions and/or over the deflecting surfaces.

With the same aim, in the area of the duct of each semi-distributor including the deflecting partitions, it is advantageous on the one hand, for the cross-section of each individual channel delimited by two successive deflecting partitions to remain substantially constant over the whole length of the channel, i.e. while the air flow passes over the area of said partitions, and on the other hand, for the ratio of each cross-section of an individual channel to the lateral surface of this same channel to remain substantially equivalent between all the channels delimited by the partitions.

Moreover, in such configurations, in order to reduce the drag in cruising flight still further, at least one closing cover is advantageously mounted on the upper portion of said load-bearing structure, moveable between two positions, one an open position in which at least one fan is open in vertical flight configuration, and one a closed position of said fan, in which the cover covers the fan for cruising flight.

A considerable advantage of the device of the invention, and of a heavier-than-air aircraft fitted therewith, is that a continuous volume, at least partially dedicated to a payload, is arranged at least below and between said at least two axial fans with air distributor-diffuser.

A further purpose of the invention is a vertical or short take-off and landing heavier-than-air aircraft comprising a load-bearing structure that forms in particular the fuselage of the heavier-than-air aircraft, and supporting a lift-generating device that is characterized in that said device is as defined above.

In a variant of the heavier-than-air aircraft, said device is supported in the upper portion of said load-bearing structure, the lower portion of which is arranged as a nacelle housing in particular an engine and supporting at least one front transverse, triangular or delta aerofoil, and/or a rear aerofoil and/or an aerofoil that is arranged between said two longitudinal deflecting surfaces or pluralities of surfaces of said device.

The heavier-than-air aircraft according to the invention can also be such that its load-bearing structure supports at least one wing extending in the lateral extension of the load-bearing structure and immediately above the lateral outlet openings of the curved ducts of the air distributor-diffuser.

The heavier-than-air aircraft according to the invention can in addition advantageously comprise a number of fans the majority of which are fitted with contra-rotating propellers and do not have a flow rectifier, due to the advantages specific to this type of axial fan, as shown hereinafter.

In order to satisfy the requirements for excellent aerodynamics so as to reach high speeds, and a significant load transportation capacity of a heavier-than-air aircraft fitted with the device according to the invention as specified below, the architectural choices of the invention include the presence of at least two vertical-axis axial fans, centred one behind another on the roll axis, which make it possible to draw a substantial air flow, and therefore generate substantial vertical thrust, for a limited lateral space requirement. In order to obtain sufficient thrust, the choice is made in the present invention to align several fans in the load-bearing structure, forming the fuselage of the heavier-than-air aircraft, without interaction with the wings thereof. This makes it possible to limit the front surface area of the fans, and therefore the aerodynamic drag at high speed. The choice of lateral outlets for the air flow, not through-outlets from top to bottom, for at least two axial fans is made mainly to allow sufficient space in the load-bearing structure, below and between the fans, so as to be able to arrange a longitudinal space therein reserved for the payload, thus obtaining continuity of the space dedicated to the payload due to the plurality of aligned axial fans associated with air distributor-diffusers providing longitudinal outlet vents in the lateral faces of the load-bearing structure.

However, in order to conduct air flows laterally towards said longitudinal vents, under acceptable pressure loss conditions, the device according to the invention proposes to guide them via multiple deflecting walls, the generatrices of which are all parallel with the roll axis, which is a feature specific to the present application.

In addition, before the air flows strike the deflecting surfaces, these air flows are "rectified"; i.e. oriented as perfectly as possible parallel with the vertical axis of rotation of the axial fans, otherwise the pressure loss associated with striking the deflecting walls obliquely would be detrimental. In order to achieve this condition, the invention proposes not only to choose an axial fan with a single multi-blade rotor, but also to choose axial fans each of which comprises at least one multi-blade rotor rotatable about the axis of the corresponding fan, the effects of which are combined with a coaxial contra-rotating multi-blade rotor or with a flow rectifier, which can be mounted downstream or upstream of the aforementioned multi-blade rotor.

The lift-generating device of the present invention therefore combines the following technical measures:

- a plurality of aligned axial fans providing a continuous volume below and between the fans;
- air flows, vertically rectified at the outlet of the fans, in particular the axial fans associated with air distributor-diffusers, the air flow being rectified before the flow enters the channels delimited by the deflecting walls of the distributor-diffusers;
- within each air semi-distributor, a plurality of deflecting walls the generatrices of which are substantially parallel with the roll axis, the two semi-distributors being symmetrical with respect to the plane defined by the roll axis and the yaw axis; and
- air flow outlets extending longitudinally, each incorporated into respectively one of the lateral faces of the load-bearing structure and therefore the fuselage of the heavier-than-air aircraft.

Other features and advantages of the invention will become apparent from the non-limitative description given below of examples described with reference to the attached drawings, in which:

BRIEF DESCRIPTION OF THE DRAWINGS

FIG. 2 is a diagrammatic transverse half-section view of the lift-generating device of the heavier-than-air aircraft according to FIGS. 1a and 1b, through a plane passing through the axis of an axial fan and parallel with the pitch axis of the heavier-than-air aircraft, showing the change in orientation from a vertical inlet half-flow to a substantially horizontal half-flow blown transversally over a longitudinal aerofoil of the heavier-than-air aircraft in FIGS. 1a and 1b, FIG. 2a is a diagrammatic transverse half-section view similar to that in FIG. 2 an embodiment in which the longitudinal aerofoil is positioned to produce a Coandă effect;

FIG. 2b is a view similar to FIG. 2a for a variant embodiment of a longitudinal aerofoil with Coandă effect;

FIG. 2c is a diagrammatic transverse half-section view similar to that in FIG. 2, showing the angle α between an inlet section of the curved duct of the semi-distributor shown and an intermediate section between the inlet and outlet sections which corresponds to the plot of the curves in FIG. 7, FIG. 3a is a view similar to that of FIG. 2, in an embodiment including a rectifier between the multi-blade rotor of the axial fan and a semi-distributor, FIG. 3b is a view similar to that of FIG. 3a, in an embodiment including two multi-blade rotors coaxial and contra-rotating about their common axis which is the axis of the axial fan, and without a rectifier between the two rotors and the semi-distributor;

FIG. 3c is a view similar to that of FIG. 3a, in an embodiment including a distributor-deflector upstream of (above) the multi-blade rotor of the axial fan;

FIGS. 8 and 9 are diagrammatic transverse half-section views similar to FIG. 3a of a variant of the heavier-than-air aircraft in FIGS. 1a and 1b, fitted with a first example of a second embodiment of the lift-generating device of the invention, comprising a longitudinal deflecting surface partially incorporated into the curved duct or ducts of the fan or fans of the heavier-than-air aircraft and arranged on the same lateral side of the load-bearing structure of the device, FIG. 14 is a view similar to FIG. 8 of a variant in which the load-bearing structure extends laterally outwards via a high wing, above the lateral outlet of the semi-distributor or semi-distributors on the same side;

FIG. 18 is a similar view to FIG. 14 of yet another variant heavier-than-air aircraft according to the invention, making it possible to optimize the front section of the heavier-than-air aircraft, providing a fan of significant section without detracting from said front section.

DETAILED DESCRIPTION OF THE DRAWINGS

Figure 1A:
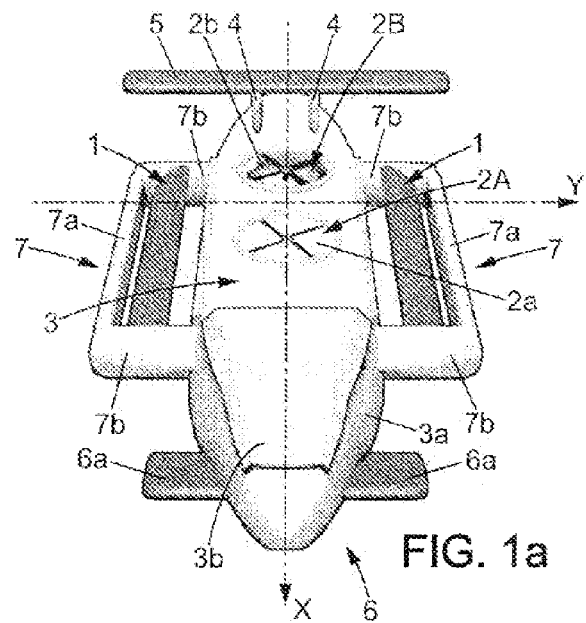
FIGS. 1a and 1b are perspective views, respectively a front top view and an angled top view of an example of a heavier-than-air aircraft according to the invention, fitted with a lift-generating device according to a first embodiment comprising longitudinal lift-generating aerofoils.
Figure 1B:
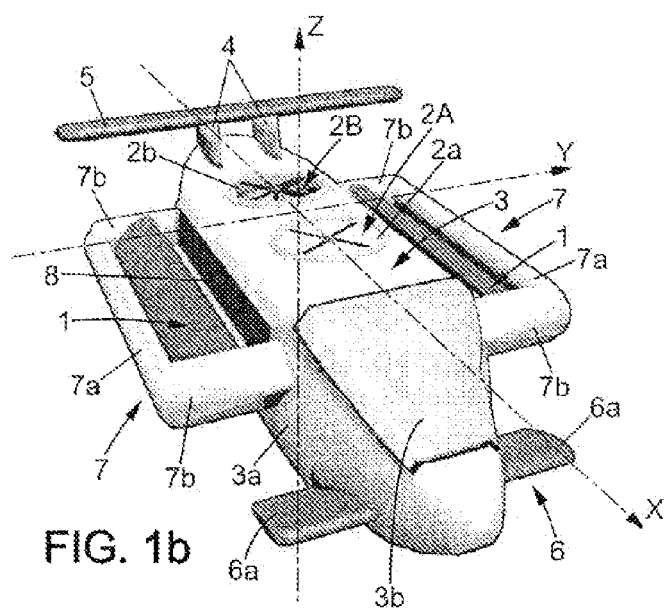

FIGS. 1a and 1b show diagrammatically an example of a heavier-than-air aircraft according to the invention, comprising a load-bearing structure 3 supporting, in its upper portion, a lift-generating device, and arranged in its lower portion as a nacelle 3a. The lift-generating device includes essentially on the one hand, an air flow generator, comprising, in this example, two axial fans 2A and 2B, the axes of rotation AA of which are parallel with the yaw axis, thus substantially vertical in the takeoff and landing phases, and each centred on the roll axis X of the device and spaced apart along this roll axis X, both being incorporated into the load-bearing structure 3, and on the other hand, two lift-generating aerofoils 1, arranged on either side of the structure 3, to which the aerofoils 1 are linked by lateral protection elements 7 and each blown laterally by an air flow leaving the generator constituted by the two fans 2A and 2B, each supplied with ambient air through a circular air intake opening respectively 2a or 2b arranged in the upper portion of the structure 3. The aerofoils 1 have aerodynamic profiles and bearing surfaces defined by substantially rectilinear generatrices extending substantially in the longitudinal direction of the heavier-than-air aircraft, and therefore of its load-bearing structure 3, i.e. substantially along the roll axis X, these aerofoils 1 being arranged symmetrically to one another with respect to the plane defined by the roll axis X and yaw axis Z, and laterally on either side of the load-bearing structure 3. The two aerofoils 1, in this example each formed by a single-piece hyper-lift wing in a rectangular plane shape (constant chord wing) and having a thickness that can be relatively small, are blown symmetrically with respect to said plane of the roll axis X and yaw axis Z by the air flow leaving the air flow generator, i.e. the fans 2A and 2B.

Thus the two aerofoils 1, called longitudinal aerofoils because they extend in the longitudinal direction of the heavier-than-air aircraft, parallel or substantially parallel with its roll axis X, develop drag forces of the same amplitude but in opposite directions, thus which cancel one another out, and lift forces which are added together to provide the lift of the heavier-than-air aircraft.

These aerofoils 1 extend over the portion of the heavier-than-air aircraft that carries the fans (2A, 2B). The length of said aerofoils 1 is greater than the sum of the diameters of the fans and they are substantially parallel with the roll axis X over a length at least equal to the sum of the diameters of the fans (2A, 2B).

In FIGS. 1a and 1b, the trailing edge, slightly convex towards the rear, of the load-bearing structure 3 is fitted with two vertical stabilizers 4, parallel and at least partially orientable, each about a respective axis parallel with the yaw axis Z, in order to stabilize the heavier-than-air aircraft in forward flight and to act as a rudder. The front portions of the stabilizers 4 are arranged on fixed vertical planes parallel with the plane of the roll axis X and yaw axis Z, and support a transverse rear aerofoil 5, as a rear double-T tail, the transverse aerofoil 5 including, in a known manner, a fixed plane adjustable about an axis parallel with the pitch axis Y, forming a stabilizer, making it possible to adjust the attitude of the heavier-than-air aircraft, and in the rear portion, one or more surfaces orientable by pivoting about a transverse axis, to act as an elevator.

The heavier-than-air aircraft also comprises a transverse front aerofoil 6 of the canard type, comprising two aerofoil elements 6a each projecting laterally on respectively one of the two sides of the nacelle 3a, where the nose cone and the fuselage lower section of the nacelle 3a meet under the cockpit 3b. The orientation of each of the aerofoil elements 6a is controlled about a transverse axis so as to contribute to balancing the heavier-than-air aircraft about the pitch axis Y.

The longitudinal lift-generating aerofoils 1 are not connected to the load-bearing structure 3 by profiled structural links in order to minimize the aerodynamic drag, as in WO 2011/067527, but by the two short transverse sides 7b of lateral protective elements 7 outwards with respect to the load-bearing structure 3 from and around the longitudinal aerofoils 1, each of the two protective elements 7 also including a long longitudinal side 7a which is rectilinear and substantially parallel with the roll axis X, between the two corresponding transverse short sides 7b, to which the long side 7a is firmly fixed, and preferably, made from a single piece at the level of the longitudinal ends of the long side 7a. In order to reduce the drag in forward cruising flight, in the direction of the roll axis X, as well as the drag caused by crosswinds and in order to protect the longitudinal aerofoils 1 therefrom, each of the two protective elements 7 is aerodynamically profiled on its outwardly-facing surface, i.e. on the side opposite the aerofoil 1 which it protects, and to this end each protective element 7 has a cross-section, through a plane passing through the yaw axis Z, which is delimited on the side opposite to the structure 3 and the aerofoils 1, by an outwardly-profiled convex edge, for example with a biconvex profile. On the other side facing the structure 3 and the aerofoils 1, the inner face of each protective element 7 is at least partially flat, in particular on the lower portion.

Thus each longitudinal aerofoil 1 is protected by respectively one of the two protective elements 7, which are also mounted symmetrically to one another with respect to the plane defined by the roll axis X and yaw axis Z, as is the case of the two aerofoils 1 themselves.

Each aerofoil 1 is thus arranged in a substantially rectangular frame delimited on one long side and the two short sides by the corresponding protective element 7, and on the other long side by the portion of the corresponding side of the structure 3 that has the blow vents 8 of this aerofoil 1, as shown for the left-hand aerofoil 1 in FIG. 1b.

Thus the protective elements 7 effectively protect the longitudinal lift-generating aerofoils 1 against lateral and longitudinal impacts as well as against the detrimental effects of crosswinds, without impeding their blowing by a lateral air flow originating from the vents 8 in the side facing the structure 3, the vents 8 being supplied with blown air flow from the axial fans 2A and 2B via distribution means internal to the structure 3 and which will be described hereinafter.

The two axial fans 2A and 2B, constituting the air compressor of the air flow generator, are preferably identical to one another and are two-stage multi-blade or faired multi-vane fans, at least one of which is a multi-blade rotor 9, for each of them, which is driven in rotation in a faired flow path 10 extending the intake opening 2a or 2b towards the inside of the structure 3, in which the two fans 2A and 2B are incorporated and driven in rotation by a power transmission (not shown) from an engine mounted in the nacelle 3a, for example an internal combustion engine supplied with fuel from a tank (not shown) also mounted in the nacelle 3a, which also houses a cockpit 3b, for the remote control and/or piloted control of the heavier-than-air aircraft, as well as a cabin and/or a hold for the transport respectively of passengers and/or cargo.

The other stage of each of the fans 2A and 2B can be a second multi-blade rotor, coaxial with the rotor 9 and contra-rotating, as described hereinafter with reference to FIG. 3b, or a multi-vane stator downstream of (below) the rotor 9, as described hereinafter with reference to FIG. 3a, or a multi-vane stator upstream of (above) the rotor 9, as described hereinafter with reference to FIG. 3c.

In any case, at the outlet of the two stages of each fan, the air flow is substantially parallel with the axis AA of the fan, therefore substantially parallel with the yaw axis Z.

By way of example, each of the axial fans 2A and 2B includes two air intake multi-blade rotors or propellers 9 and 9', as shown in FIGS. 2, 2a, 2b and 2c, the rotors or propellers 9 and 9' being driven in opposite directions about the same axis AA, so that not only is the outlet air flow "rectified" substantially parallel with the axis AA, but also so that the counter torques to the rotation of the rotors 9 and 9' cancel one another out (anti-torque provision), and the flow rate of each fan is optimized.

Similarly, as shown in FIG. 3b, each of the fans 2A and 2B can include two faired, coaxial multi-blade rotors or propellers 9 and 9', contra-rotating about their common axis AA (which is the axis of the corresponding fan) in the same flow path 10 so as to "rectify" the air flow parallel with the axis AA and cancel out the counter torque in each axial fan 2A or 2B.

In any case, the fans 2A, 2B of the device, aligned one behind another along the roll axis X on which each of them is centred, must supply the blow vents 8, arranged along the two sides of the load-bearing structure 3, opposite the longitudinal aerofoils 1, in order to provide a lateral blowing of these longitudinal aerofoils 1, so as to develop lift-generating forces of a greater intensity than the forces of gravity applied to the heavier-than-air aircraft, in order to allow vertical takeoff thereof while ensuring its stability, as is also specifically described in WO 2011/067527.

In the embodiments according to FIGS. 2 to 3c, each of the axial fans 2A and 2B has its rotor or rotors such as 9 or 9' driven in rotation about the axis AA of the fan, substantially parallel with the yaw axis Z.

As a variant of FIG. 2, FIG. 2a shows an embodiment in which each longitudinal aerofoil 1 is directly adjacent along its leading edge to the lateral edge of the structure 3 over at least the whole length of the lower edge of the facing lateral vents 8, so that the air flow leaving the vents 8 blows only the upper surface of the aerofoil 1 in order to produce a Coandă effect, in contrast to FIG. 2, in which the air flow leaving the vents 8 the upper and lower surfaces of each aerofoil 1.

In the variant in FIG. 2b, each longitudinal aerofoil 1 is the lateral extension of the lateral edge of the structure 3, to which this aerofoil 1 is firmly fixed by its leading edge, so that the Coandă effect is obtained by blowing the upper surface of the profile of the aerofoil 1 which continues on from the lower edge of the blow vents 8 over at least the whole length thereof.

Figure 5:
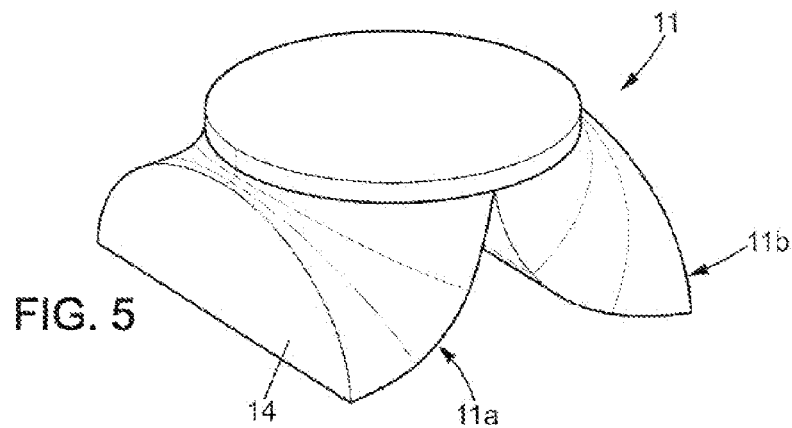
FIG. 5a is a perspective view of a semi-distributor of the distributor-diffuser in FIG. 5.
FIG. 5b is a diagrammatic side view of the semi-distributor in FIG. 5a, FIG. 5c is a top view of the semi-distributor in FIG. 5a, representing the development of the semi-elliptical top sections, in the direction of the semi-circular opening of the curved channel.
FIG. 5d is a view similar to FIG. 5c but viewed facing the outlet opening of the semi-distributor in FIG. 5a, FIG. 6 shows a set of plots of quarter ellipses in their plane showing the development of the semi-elliptical sections of the curved duct of a semi-distributor in FIG. 5a, between its inlet opening and its outlet opening.
Figure 5A:
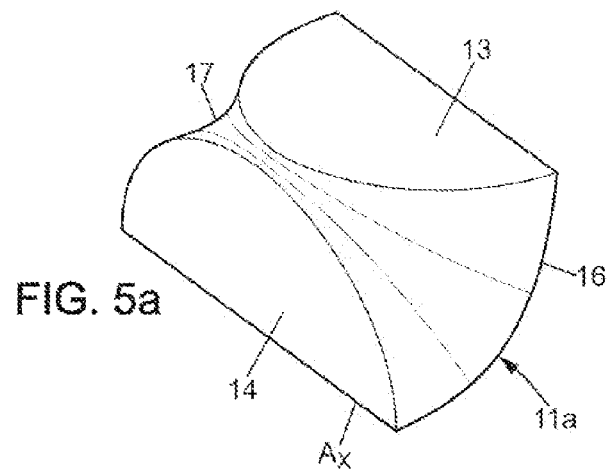

In all of FIGS. 2 to 3c, downstream of the flow path 10 having a circular cross-section, in which the two multi-blade or multi-vane (rotor(s) or stator) stages of each fan 2A or 2B are faired, the outlet flow of the propeller 9 or of the rotors or propellers 9 and 9' (FIGS. 2 to 2c and 3b) is divided into two halves in a distributor-diffuser 11, diagrammatically shown in perspective in FIG. 5. This air distributor-diffuser 11 is subdivided into two halves or semi-distributors 11a and 11b, which are adjacent to one another and symmetrical to one another with respect to the plane defined by the axis AA of the fan (substantially parallel with the yaw axis Z) and the roll axis X, when the air distributor-diffuser 11 is suitably positioned in the extension of the faired flow path 10 towards the inside of the load-bearing structure 3, the semi-distributor 11a on the left in FIG. 5 being shown diagrammatically in perspective view in FIG. 5a and in cross-section in FIGS. 2 to 3b. Each of the two semi-distributors 11a and 11b delimits a curved duct 12 (see FIGS. 2, 2a, 2b, 2c, 3a, 3b and 3c) between a semi-circular inlet opening 13 in a plane perpendicular to the axis AA of the fan, and an outlet opening 14 having a semi-elliptical shape for example, in a plane substantially parallel with the axis AA of the fan or slightly inclined on this axis AA, and extending along its long axis Ax, which is parallel with the roll axis X when the distributor-diffuser 11 is in the operational position in the structure 3. In this position, the outlet opening 14 is situated upstream of or even directly at the level of the lateral vents 8 of the structure 3, on one side of this structure 3, for the transverse blowing of the longitudinal aerofoil 1 facing these vents 8, as shown diagrammatically in FIGS. 2 to 3c.

Thus each semi-distributor 11a or 11b receives through its inlet opening 13, respectively one of the two halves of the air flow leaving the fan 2A or 2b, this half-flow being delimited about the hub or hubs of the rotor 9 or of the rotors 9 and 9', and a respective side of the plane delimited by the axis AA of the fan and the roll axis X. This half air flow captured by the opening 13 of a semi-distributor 11a or 11b is thus on the side of respectively one of the two longitudinal aerofoils 1, towards which the outlet opening 14 the corresponding curved duct 12 directs this half air flow which passes through this curved duct 12. Thus, each of the two longitudinal aerofoils 1 is laterally blown by whichever of the two semi-distributors 11a and 11b is located on the same side as the aerofoil 1 in question, with respect to the plane defined by the roll axis X and the yaw axis Z. In this way, the air flow drawn in by each axial fan 2A or 2B by the rotation of its rotor(s) 9 and 9' is divided into two halves, each one of which passes through respectively one of the two semi-distributors 11a and 11b, in order to be laterally blown over respectively one of the two longitudinal aerofoils 1 situated on the same side as the corresponding semi-distributor 11a or 11b.

Moreover, in each semi-distributor 11a or 11b, the corresponding curved duct 12 receives, between its inlet opening 13 and its outlet opening 14, a plurality of deflecting partitions 15, which delimit channels that channel half of the air flow passing through this curved duct 12. These partitions 15 are defined on the one hand by generatrices that are all parallel with the roll axis X and on the other hand, curved so that all the longitudinal partitions 15 have their concavity facing substantially in the same direction, i.e. upwards and towards the side of the load-bearing structure 3 where the longitudinal aerofoil 1 extends, blown transversally by the half air flow that passes through the curved duct 12 the plurality of partitions 15 in question.

In the examples in FIGS. 2, 2a, 2b and 2c, the curved duct 12 houses three longitudinal curved partitions 15, between a long inner and lower wall 16, delimiting the curved duct 12 of a semi-distributor such as 11a towards the other semi-distributor such as 11b, and a short outer and upper wall 17, delimiting this same curved duct 12 on the side of the mid or common centre of curvature of the curved partitions 15. It should be noted that the inner and lower wall 16 is also curved and concave towards the inside of the duct 12 in the same direction as the partitions 15, while the upper outer wall 17 is also curved in the same direction but having its convexity facing the inside of the curved duct 12, the two walls 16 and 17 also being defined by generatrices parallel with the roll axis X.

In the examples in FIG. 3a (with a rotor 9 and a stator rectifier 18 described hereinafter), 3b (with two contra-rotating rotors 9 and 9') and 3c (with a rotor 9 and a stator distributor-deflector 18 described hereinafter), the plurality of curved longitudinal partitions 15 only comprises two partitions 15 between the lower inner wall 16 and the upper and outer wall 17, but in all the embodiments, it can be assumed that the mid or common centre of curvature of these partitions 15 and walls 16 and 17, all curved and defined by generatrices parallel with the roll axis X, are on the side or substantially at the level of the upper edge of the corresponding lateral side of the structure 3, substantially at the intersection of the plane of the outlet opening 14 and the plane of the intake inlet 2a or 2b of the corresponding fan.

Figure 15:
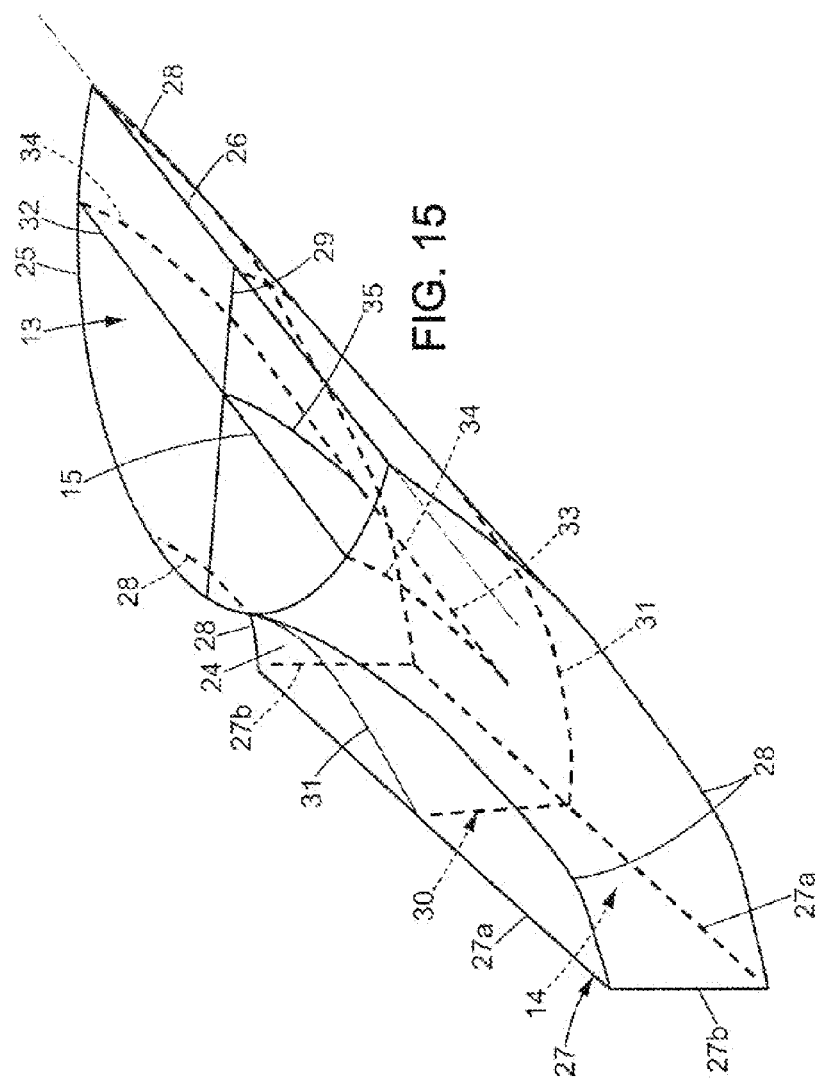
FIG. 15 is a diagrammatic perspective view of an ultra-light embodiment of a curved duct made of fabric, stretched into shape by stiffeners.

Moreover, each semi-distributor 11a or 11b is produced so that the area of the cross-section of the curved duct 12, perpendicular to the local direction of flow of the air in this curved duct 12, is substantially constant and equal to the area of the section of the inlet opening 13 of the corresponding curved duct 12, from the latter to the section of the outlet opening 14, or preferably, progressively and increasing continuously from the inlet opening 13 to the outlet opening 14, so that the ratio of the area of the section of the outlet 14 to the area of the section of the inlet 13 (in a semi-circle) is comprised between 1 and 2, preferably between 1 and 1.2, which produces a beneficial effect both on the thrust and on a better pressure balance between the inside of the duct and the ambient pressure, which makes it possible to use a "fabric" to constitute the walls of the sheath, as described in greater detail with reference to FIG. 15.

As a variant, the outlet opening 14 can be different from a semi-ellipse, and can be more generally an opening flattened in a direction parallel with the roll axis X, and in particular, an opening having an ovoid or even rectangular, or almost rectangular, shape.

In the case of such a variant, the shape of the cross-section of the curved duct 12 of each semi-distributor 11a or 11b develops progressively from a semi-circular shape at the inlet opening 13, in a plane substantially perpendicular to the axis AA of the fan, to an ovoid or substantially rectangular shape at the outlet opening 14, in a plane substantially parallel with the axis AA of the fan, or inclined on the axis of the fan.

In a particular embodiment, the shape of the cross-sections of the curved duct 12 develops progressively, starting from the semi-circular inlet opening 13, in semi-ellipses the cross-sectional area of which is at least substantially constant, and preferably progressively increasing and elongated along their long axis, which is parallel with the roll axis X, to a semi-ellipse of longer axis at the outlet opening 14.

Figure 6:
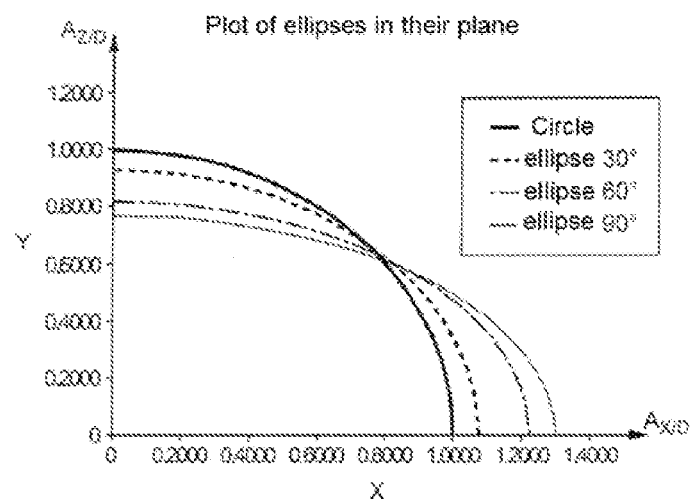

As the area of the cross-section of the curved duct 12 is at least substantially constant, and as the long axis of the semi-ellipses increases progressively from the inlet opening 13 to the outlet opening 14, this means that correlatively, the short axis becomes progressively smaller from the inlet opening 13 to the outlet opening 14, as shown in FIG. 6, through four curves, one of which, passing through the values 1 on the x-axis and y-axis, corresponds to the semi-circular inlet opening 13, another of which, passing through the value 1.3 on the x-axis and 0.77 on the y-axis, corresponds to the semi-ellipse with the longest axis at the outlet opening 14, and the other two of which correspond respectively to a semi-ellipse at 30° and to a semi-ellipse at 60° for an angle α of respectively 30° and 60°, as shown in FIG. 2c, between the plane substantially of the inlet opening of the fan and the plane O1O2 of a main section, where O1 is the plot of the mid or common axis of curvature of the partitions 15 and curved walls 16 and 17, or substantially at the intersection of the planes of the inlet opening 13 and outlet opening 14.

Thus the long axis of the semi-ellipse of the outlet opening 14 can be comprised substantially between 1.2D and 1.5D, where D is the diameter of the semi-circular section of the inlet opening 13.

Figure 7:
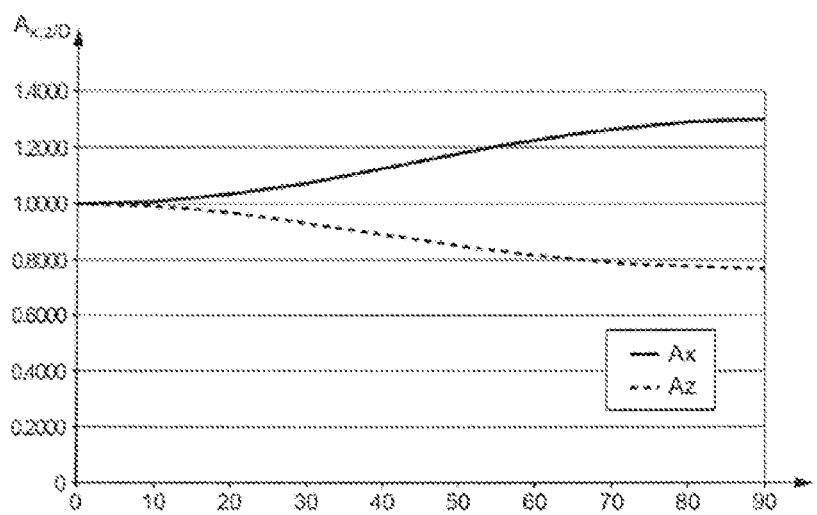
FIG. 7 shows, on the y-axis, the values of the long axis and the short axis during the development of the semi-elliptical forms of the curved duct of a semi-distributor, as a function of the value of the angle α between the inlet section and a main section for which a varies from 0° to 90°, i.e. up to the outlet section of the curved duct.

In the embodiment shown in FIGS. 5a to 5d and 6, as well as FIG. 7, the long axis Ax of the semi-elliptical section of the curved duct 12 develops progressively between D at the inlet opening 13 and 1.3D at the outlet opening 14, and the short axis Az of the semi-elliptical section develops progressively between D and 0.77D (where D is still the diameter of the section of the inlet opening 13), FIG. 7 showing that the development of the values of the long and short axes of the semi-elliptical section Ax and Az takes place progressively along two curves, as a function of the angle α in FIG. 2c, which varies between 0° and 90°, such that the two curves have horizontal tangents at their two ends, for α=0° (the two tangents are merged at the value 1 for $A_x/D$ and $A_z/D$) and for α=90° (where $$\frac{A_x}{D} = 1.3 \text{ and } \frac{A_z}{D} = 0.77.).$$

Moreover, the two curves have a point of inflexion between their two ends, more specifically for α close to 45°.

The horizontal tangents at the two ends of the curves for 0° and 90° represent a necessary condition for the air flow passing through each curved duct 12, i.e. the half of the total air flow delivered by the rotor 9, or the rotors 9 and 9', to be perpendicular to the sections of the inlet opening 13 and outlet opening 14 of the curved duct 12. The invariability of the area of the cross-section of the curved duct 12 is a minimum condition to be respected in order to reduce the pressure losses on passing through the semi-distributors 11a and 11b, avoiding local overpressures and reduction in the air flow velocity.

As a variant embodiment, with reference for example to FIG. 12, described in more detail hereinafter, the duct 12 is constituted, starting from its semi-circular inlet opening 13, by a first portion or upstream portion that is curved and comprises deflecting partitions 15 for guiding the air flow passing through the duct 12, the cross-sections of which develop progressively from the semi-circular section at the inlet 13 to substantially semi-elliptical sections, and a second portion, or downstream portion extending downstream of the partitions 15, and therefore without these partitions 15, which is substantially straight or rectilinear, with cross-sections the shape of which develops progressively so as to provide the connection between the last substantially semi-elliptical section of the upstream portion, at the level of the trailing edge of the partitions 15, and the substantially rectangular section of the outlet opening 14 of this duct 12. In this variant embodiment, the development of the cross-section of the substantially semi-elliptical duct 12 is reserved for the significantly curved upstream portion of the duct 12, then is continued in the substantially rectilinear or slightly curved downstream portion of the duct 12, via flattened ovoid sections (in a semi oval) to the substantially rectangular outlet section 14.

Figure 12:
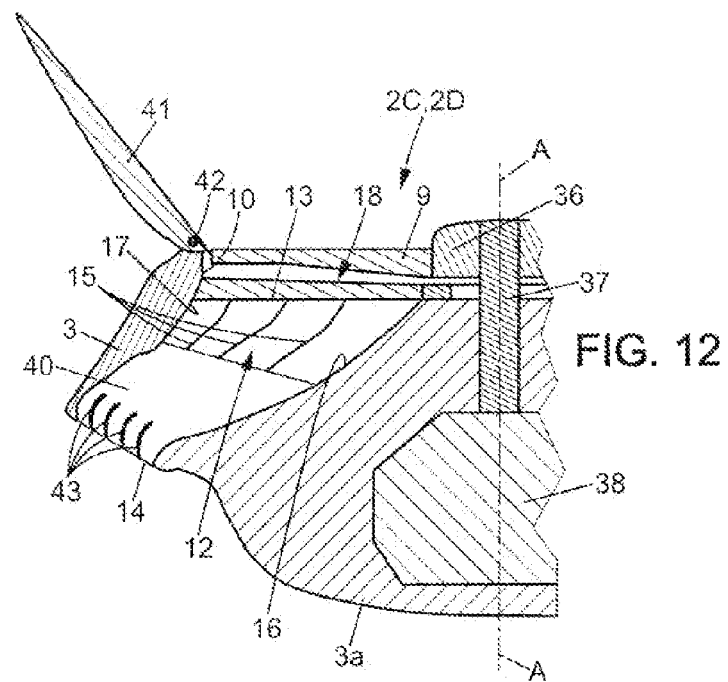

In addition, with reference for example to FIG. 2 or 12, in order to balance the pressure losses in the area of the duct 12 including the partitions 15, and limit their weight, it is beneficial to limit the number of partitions 15 to 4 or 5 and to choose their radial positioning so that on the one hand, the cross-section of each channel delimited by two neighbouring partitions 15 remains substantially constant over the whole length of the channel, i.e. while the air flow passes through the area of the partitions 15, and on the other hand, the ratio of each cross-section to the lateral surface of each channel remains substantially equivalent between all the channels delimited by the partitions 15.

Figure 4A:
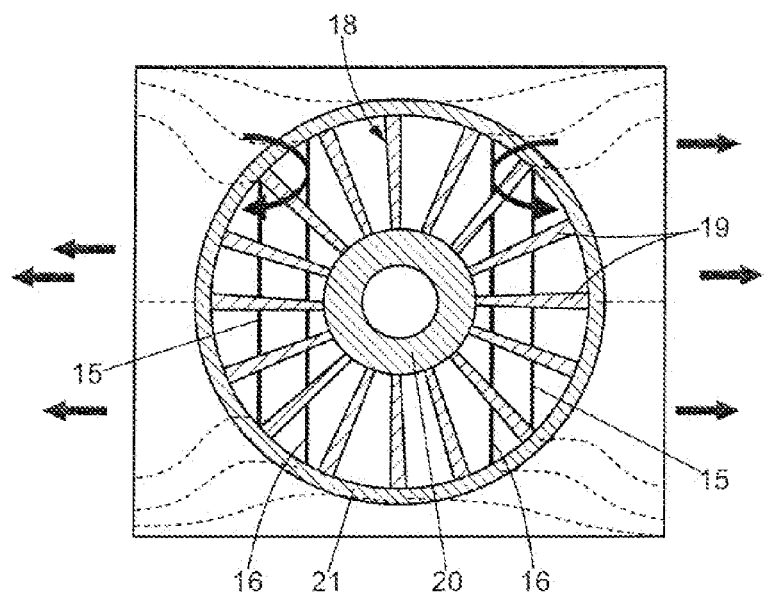
FIG. 4a is a diagrammatic plan view of the rectifier shown in FIG. 3a, after removing the multi-blade rotor.
Figure 4B:
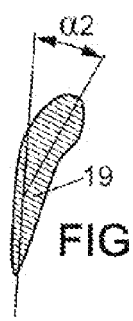
FIG. 4b is a diagrammatic transverse cross-sectional view of the aerodynamic profile with twist profile of the vanes of the rectifier in FIG. 4a, FIG. 5 is a diagrammatic perspective view of an example of a distributor-diffuser of a lift-generating device according to the invention.

The embodiment in FIGS. 3a, 4a and 4b has the additional advantage of also including, compared to the examples in FIGS. 2, 2a, 2b, 2c and 3b, a stator flow rectifier 18, represented diagrammatically in plan view in FIG. 4a, and arranged, as shown in FIG. 3a, immediately downstream of the multi-blade rotor 9, between the latter and the two semi-distributors 11a and 11b. This rectifier 18 includes a plurality of fixed vanes 19, for example fifteen vanes 19, which have the function of reducing or eliminating the gyratory component of the flow leaving the plane of the corresponding axial fan, i.e. at the outlet of the rotor 9, so that the orientation of the flow becomes completely parallel with the axis AA of the fan, which has the principal effect of providing a better angle of attack of the partitions 16 which themselves have an orientation parallel with the roll axis X. This arrangement also makes it possible to recover a larger portion of the kinetic energy in the direction parallel with the axis AA of the fan, and therefore better propulsive efficiency. The fixed vanes 19 extend radially between an annular hub 20, through which the drive shaft of the rotor 9 passes, and a peripheral circular rim 21, which is coaxial with the annular hub 20 about the axis AA of the fan, and which is fixed to the load-bearing structure 3. The fixed vanes 19 can have a chord which is maximal close to the hub 20 and which diminishes progressively towards the rim 21. In addition, the angle of attack of the vanes 19 varies with the distance from the axis AA as indicated hereinafter. In fact, as shown in FIG. 4b, each vane 19 has an aerodynamic profile the upper surface of which is convex and the lower surface concave, with a leading edge inclined according to a twist profile that varies the angle of inclination α2 of the leading edge along the span of the vane 19, so as to adapt the aerodynamic profile of this vane 19 to the variation of the deflection of the air flow leaving the rotor 9, as a function of the distance between the point in question on the span of the vane 19 and the axis AA of the fan.

Alternatively, as shown in FIG. 3c, it is possible to invert the positions of the multi-blade rotor and of the flow "rectifier" by placing a flow distributor-deflector 18' at the head, before the rotor 9 and above it in FIG. 3c. In this position, the air flow distributor-deflector 18' is also constituted by fixed blades 19', the incidence of which varies from the centre to the outside. The purpose of this prior deflection of the flow at the level of said distributor-deflector 18' is that the deflections of said distributor-deflector 18' and those of said at least one rotor 9 cancel one another out and the flow returns to an axial orientation (AA) after passing through said multi-blade rotor 9.

Finally, as shown in FIGS. 3a and 3b, two streamlined ribs 22 and 22', each having a wedge-shaped cross-section, can be fixed along the respective upper and lower edges of the blow vents 8, projecting by their streamlined portion towards the longitudinal aerofoil 1 facing the vents 8 in question, so as to obtain an ejector effect, through which the air flow leaving via the vents 8 and originating from the outlet opening 14 of one, such as 11a, of the two semi-distributors, draws in ambient air originating from above and below the structure 3, said ambient air diluting the air flow leaving the vents 8 while reducing the pressure losses at the outlet of said vents 8. To this end, the face of each rib 22 or 22' that is facing outwards and towards the aerofoil 1 is a concave face, with a concavity facing towards this aerofoil 1, which facilitates the drawing in of an additional flow of ambient air by the air flow leaving via the outlet opening 14 of the curved duct 12. Moreover, FIGS. 3a and 3b also show that at the level of the outlet opening 14 of the curved duct 12 of each semi-distributor such as 11a, the ends of the partitions 15 and longitudinal curved walls 16 and 17 that are close to the outlet opening 14 can be inclined at an angle α1 on a plane perpendicular to the axis AA of the fan which can be comprised between approximately 0° and approximately 60°, without too great a detriment to the pressure losses. In this case, the transverse air flow blowing the longitudinal aerofoils 1 has a downward direction according to an angle α1 that can be optimized as a function of the aerodynamic characteristics of the longitudinal aerofoils 1.

As shown in FIG. 3a, the inner and upper edge of the curved longitudinal partitions 15 can be embedded in notches 23 arranged in the base of the vanes 19 of the rectifier 18. So that these partitions 15 are very light, they can advantageously be produced from a carbon-fibre composite material, for example, or a composite fabric reinforced by stiffeners, as may be the case for the wings of flying craft known as ULM (Ultra Light Motorized) or like the sails of sailing boats. This provision, which uses composite or "ULM" type fabrics will be favoured by the careful selection of the ratio between the section of the lateral outlet 14 and the section of the inlet 13 of the duct 12. In fact, this choice governs the level of differential pressure between the inside and the outside of the duct 12 and thus the level of structural reinforcement of the partitions 16 and 17 in particular. For a ratio of the outlet 14/inlet 13 sections that remains comprised between 1 approximately 1.20, the pressure differential is very low and thus allows a light construction of the duct 12.

More generally, each of the two semi-distributors 11a and 11b can be produced in an ultra-light structure with a fabric or cloth sheath shaped and stretched by stays, and an embodiment is shown diagrammatically in FIG. 15. This FIG. 15 shows a semi-distributor similar to the one 11a described above, the cloth 24 of which is shaped and held taut in the manner described above by stays constituted by stiffeners in the form of composite battens reinforced with glass fibre or carbon fibre, embedded in a matrix of a hardening synthetic resin, which reinforce the cloth 24 along all the ridges or projecting edges of the semi-distributor. These stiffeners comprise in particular a semi-circular stiffener 25 underlaid by a diametral stiffener 26 in order to form a frame defining the inlet opening 13, a substantially rectangular stiffener 25 forming a frame defining the outlet opening 14, and itself constituted by four battens, two of which are long 27a and two short 27b, and curved stiffeners oriented in the direction of the air flow passing through the curved duct 12 delimited by this sheath, two stiffeners 28 of which define the lateral ridges of each side, as well as intermediate stiffeners, such as 29, 30 and 31 substantially at the mid-width of the semi-distributor, all the solid or dotted lines in FIG. 15 corresponding to composite stiffeners that reinforce the cloth 24 of the sheath, in which a single curved partition 15 has been shown for greater clarity of the drawing, and itself constituted by a rectangle of cloth surrounded by a frame two opposite sides of which are rectilinear and parallel with the roll axis X, one of them 32 being in the frame of the inlet opening 13, and the other 33 inside the sheath, at the lower ends of two curved stiffeners 34 the other ends of which are connected to the frame of the inlet opening 13, at the ends of the stiffener 32. This curved partition 15 also has its rectangle of cloth reinforced by a curved middle stiffener 35 connecting the two rectilinear stiffeners 32 and 33 of this partition 15.

In the embodiments described above, in order to improve the quality of the flow in the area including the partitions 15 and thus reduce the pressure losses in this area, or in order to increase the lift at the level of the longitudinal aerofoils 1, strips of "anti-turbulence" devices can advantageously be placed on the upper surface of these partitions 15, and/or on the upper surface of the aerofoils 1. These devices, having a width for example of several centimeters (5 cm approximately), can preferably be self-excited vibrating membranes or active vibrating membranes activated by piezoelectricity. This provision is represented diagrammatically in FIG. 3a, in which strips of vibrating membranes 15a are arranged longitudinally, i.e. parallel with the roll axis (X), on the upper surface of the partitions 15, as well as in FIGS. 2 and 2a showing similar vibrating strips 1a arranged along the upper surface of the profile 1, with the same orientation parallel with the roll axis X.

Active or self-exciting vibrating membranes such as membranes 1a and 15a in FIGS. 2, 2a and 3a can also be mounted parallel with the roll axis X on the upper surfaces of the deflecting vanes 39 and 43 of the embodiments according to FIGS. 8 to 14 hereinafter.

A second embodiment of the invention is represented diagrammatically in FIGS. 8 and 9, which show one of two axial fans 2C, 2D, mounted one behind another in the load-bearing structure 3 of a heavier-than-air aircraft, in the same manner as previously described for the two axial fans 2A and 2B in FIGS. 1a to 4b.

Each axial fan therefore contains at least one multi-blade rotor 9, and optionally two multi-blade rotors, such as 9 and 9' in FIG. 3b, coaxial and contra-rotating, each driven in rotation about the axis AA of the corresponding fan by its hub, such as 36, and a drive shaft, such as 37, linked to an power unit 38 housed in the nacelle 3a of the heavier-than-air aircraft, which is defined by a continuous longitudinal volume delimited in the portion of the load-bearing structure forming the fuselage of the heavier-than-air aircraft, between and below the axial fans 2C, 2D associated with air distributor-diffusers 11, and at least a portion of which can be dedicated to holding a payload.

As previously, each rotor such as 9 is rotatably mounted in a faired flow path 10 having a circular cross-section, which extends, towards the inside of the load-bearing structure 3, a circular air intake opening 2c or 2d arranged in the upper surface of the structure 3 and each rotor 9 is associated with at least one other rotor or stator and rectifier stage. Below the rotor 9, or two coaxial, contra-rotating rotors, there are also an air flow rectifier 18 with radial vanes 19 fixed around an annular hub 20 through which the shaft 37 of the rotor 9 passes, or the shafts for driving the rotors if applicable, and below the rectifier 18, symmetrically on either side of the plane defined by the roll axis X and yaw axis Z of the heavier-than-air aircraft, two air semi-distributors such as the one 11a previously described with reference to FIGS. 2 to 3c, which delimits in the structure 3a curved duct 12, between a semi-circular inlet opening 13 below the rectifier 18 and an outlet opening 14 having a substantially rectangular shape and elongated in the longitudinal direction, parallel with the roll axis X of the heavier-than-air aircraft, and in which the half of the outlet flow from the corresponding fan 2C or 2D is channeled by curved longitudinal deflecting partitions 15, spaced apart from one another, each defined by generatrices parallel with the roll axis X.

Between a long lower inner wall 16 and a short upper outer wall 17 against the structure 3, these partitions 15 and longitudinal walls 16 and 17 all have their concavity oriented upwards and laterally towards the outside of the structure 3 with respect to the plane of symmetry defined by the roll axis X and the yaw axis Z of the heavier-than-air aircraft.

The particular feature of the embodiment in FIGS. 8 and 9 is that an aerodynamically profiled longitudinal deflecting vane 39 is mounted in the outlet end of the curved duct 12, downstream of the curved partitions 15, and this vane 39 is also curved and defined by generatrices parallel with the roll axis X, but has its concavity facing in the opposite direction from the concavity of the curved partitions and walls 15, 16 and 17, i.e. the vane 39 has its concavity facing downwards and inwards, on the side of the nacelle 3a and of the power unit 38, so that the vane 39, an upstream portion of which is engaged in the curved duct 32, and the downstream portion of which projects outside the outlet opening 14, deflects the air flow passing through the curved duct 12 downwards, in order to generate, as a reaction to the air flow directed downwards, a lift-generating force directed upwards on the load-bearing structure 3, and to which is added a lift-generating force generated by the air flow over the profiled vane 39, which in the operational position is fixed with respect to the load-bearing structure 3 in the jet deflecting position shown in FIGS. 8 and 9.

Thus the vertical descending air flow of each fan 2C, 2D is subdivided into two half-flows, each of which is guided and moved laterally aside by the corresponding semi-distributor such as 11a, then this half-flow is deflected downwards by the profiled vane 39 in a substantially vertical descending half-flow, which contributes in particular to the lift necessary for the lift-generation of the heavier-than-air aircraft, the overall lift being the result of a sum of components such as for example the force exerted at the level of the inlet of each fan 2c, 2d by negative pressure, the force exerted on the walls and partitions of the ducts 12, and finally the lift-generating force exerted on the longitudinal aerofoils 39. The advantage of such an arrangement is that the whole of the flow is "blown" over the two longitudinal aerofoils 39, thus providing the benefit of a significant contribution from the lift of these aerofoils 39, which makes it possible to better control the roll and pitch stability of the heavier-than-air aircraft, taking account of the spacing apart of the points of application of these forces. In addition, this arrangement frees space for the cabin and the engine 38 in the nacelle 3a.

As shown in FIG. 9, each half-flow from each of the two fans 2C and 2D mounted one behind another is thus offset laterally with respect to the roll axis X, by a distance d1 that is at least equal to and preferably greater than the radius of the fan 2C and 2D when this half-flow reaches the vane 39, which deflects it downwards.

Such a configuration has the advantage of providing both excellent stability in vertical flight and in transition between vertical flight and cruising flight, and a small main cross-section of the heavier-than-air aircraft with respect to the flow delivered by the fans.

In fact, as is apparent from FIG. 9, this configuration provides laterally distributed lift on either side of the plane of symmetry defined by the roll axis X and yaw axis Z, over the whole length of the fans 2C and 2D. This lift can also be modulated in the longitudinal direction (parallel with the roll axis X), so that it is thus possible to control both the roll and the pitch.

The lift-generating force F1 exerted on the profiled deflecting vane 39 is therefore applied on either side of the aforementioned plane of symmetry XZ, at a significant distance d1 from this plane, which provides a more effective righting moment. Simultaneously, these lift forces F1 are exerted at a distance d2 (see FIG. 9) above the centre of gravity G situated at the level of the power unit 38 (and where the weight vector W is applied). This arrangement is more beneficial for stability than if the centre of gravity G was placed above the lift plane.

Concerning the small main cross-section with respect to the air flow of the fans, it must be emphasized that the alignment of the fans (preferably at least one pair) 2C and 2D on the roll axis X of the heavier-than-air aircraft means that the diameter of these fans 2C and 2D can be dimensioned to the limits of the width of the nacelle 3a of the heavier-than-air aircraft or of the load-bearing structure 3, preferably more than 80% of this width, hence a maximum flow per fan, which is very advantageous because in order to reduce the installed power of the engine 38 in order to obtain a given lift force, it is beneficial to obtain a maximum air flow at low speed, therefore to use fans 2C and 2D with a large section (everything else being equal, the engine power necessary to produce lift is inversely proportional to the square root of the section of the fans). Moreover, the number of the fans can be increased without detriment to the main cross-section, because due to the alignment of the fans one behind another, the drag does not increase in the same proportion as the flow if the number of fans increases.

Due to this, in all the variants described in the present specification, the number n of fans of the heavier-than-air aircraft can be greater than 10. Preferably, this number n is even when each fan comprises only a single multi-blade rotor, advantageously associated with a flow rectifier downstream or upstream of the rotor. In this case, n can vary from 2 to 14, according to the mass and size of the heavier-than-air aircraft.

But if each fan includes two contra-rotating rotors as described above with reference to FIG. 3b, the number of fans can be even or odd. Such an embodiment is advantageous because multi-blade contra-rotating fans have the advantage of cancelling out the gyroscopic torque and, due to the fact that these fans may have no flow rectifier, also have the advantages of cancelling out the gyratory torque and increasing the efficiency of the faired fans by approximately 20%, which are also obtained when the flow is "rectified" by the combination of a rotor with at least one stator rectifier upstream or downstream of the rotor.

All these fans or at least two, and preferably a majority of them, are advantageously of the axial type.

Figure 10:
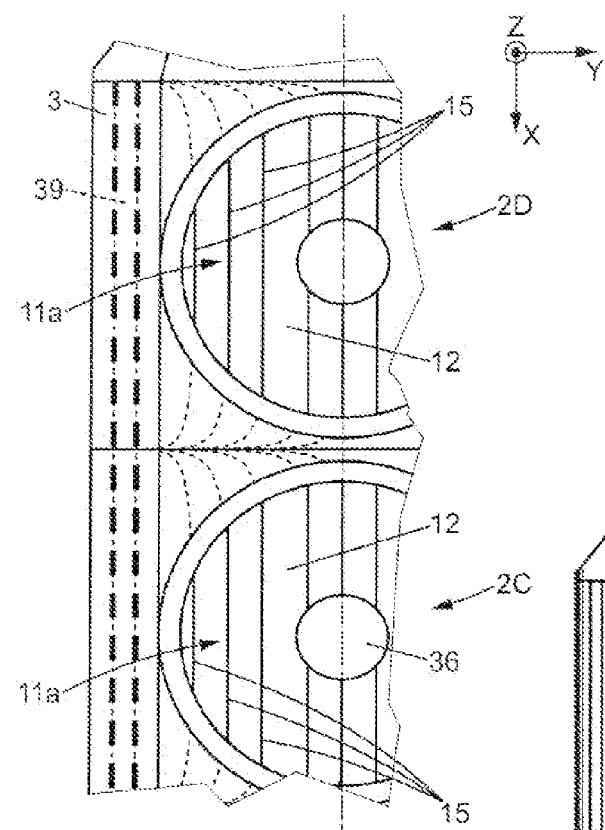
FIG. 10 is a diagrammatic plan view of a portion with two fans of the heavier-than-air aircraft in FIGS. 8 and 9 showing the continuity of the longitudinal deflecting vane in bold dotted lines and the boundary of the deflecting partitions in faint dotted lines, in which the rectifiers and multi-blade rotors of the fans are not shown for the sake of clarity.

Concerning the stability of the heavier-than-air aircraft and the simplicity of its production, it is recommended, as shown in FIG. 10, not to mount a specific longitudinal deflecting vane such as 39 in the semi-distributor 11a of each of the different fans such as 2C and 2D mounted one behind another on the same side of the heavier-than-air aircraft, but on the contrary to provide for a single longitudinal deflecting vane 39 that is common to all the semi-distributors 11a on the same side of the heavier-than-air aircraft, therefore extending over the whole length of the different fans 2C and 2D, in an outlet manifold 40 is common to all the curved ducts 12 of the same corresponding side of the heavier-than-air aircraft, and delimited between the downstream end of the curved partitions 15 and the outlet opening 14, which in this case is also common to all the curved ducts 12 on said same side of the heavier-than-air aircraft. The upstream portion of the vane 39 is engaged over its whole length in this common outlet manifold 40 and the downstream portion of the vane 39 projects over its whole length outside this outlet manifold 40 and is oriented substantially downwards.

FIG. 10 is a bottom view of a portion of the two fans 2C and 2D arranged one behind another, and for greater clarity the rotors of the fans and the rectifiers are not shown. The longitudinal continuity of the profiled deflecting vane 39 is clearly shown, marked in bold dotted lines, extending over the whole length of the two fans 2C and 2D, in the opening of the longitudinal outlet 14 and the longitudinal outlet manifold 40 thus arranged in the corresponding side of the load-bearing structure 3. The boundary of the curved partitions 15, outside the projection of the corresponding intake opening 2c or 2d, is also shown in faint dotted lines.

In order to prepare the heavier-than-air aircraft for a high cruising speed, at least one longitudinal closing shutter or cover 41 with a profiled cross-section, is moveably mounted, for example pivoting about a horizontal axis 42 substantially parallel with the roll axis X, along an upper longitudinal long side of the load-bearing structure 3, and this or these cover(s) 41 extend(s) over the whole length of the fans such as 2C and 2D, and in plan view has (have) an outer shape that is substantially rectangular. Thus by folding back the cover(s) 41 over the intake openings of the fans 2C and 2D by pivoting about the axis 42, using one or more closing/opening cylinders for example (not shown), and by carrying out the same operation on the similar pivoting cover(s) 41 on the other side, in order to cover the halves of the fans 2C and 2D situated on the other side of the plane of symmetry XZ, it is possible to close all the openings associated with the fans in the upper surface of the load-bearing structure 3, as also shown in FIGS. 11a and 11c, showing respectively a cover 41 in the raised position, corresponding to the opening and operation of the fans for vertical flight, and a cover 41 in the lowered position, corresponding to the closing of the fans that are not active in cruising flight.

As a variant (not shown) the moveable cover(s) is (are) slidably mounted along the load-bearing structure 3, on the latter, between an open position and a closed position of the fans, respectively for vertical flight and cruising flight.

Figure 11A:
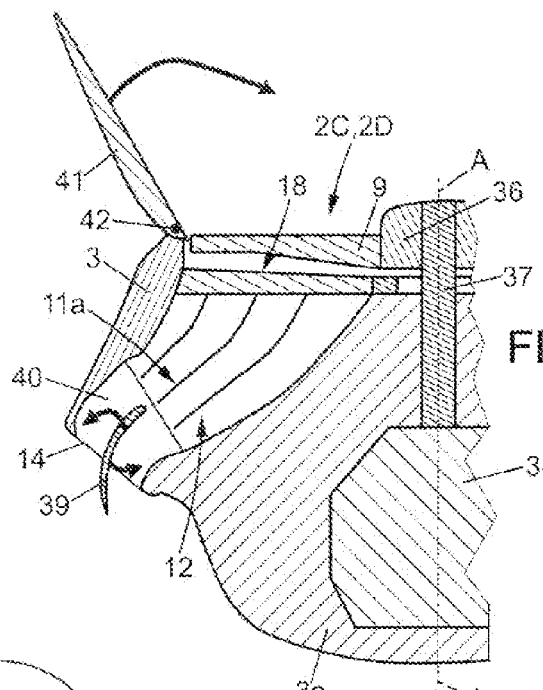
FIGS. 11a and 11c are views similar to FIGS. 8 and 9 of a variant embodiment in which the deflecting vane is mounted pivotably between an operating position, providing air jet deflection for vertical flight, and a position of closure of the outlet of the curved ducts on the same side, for cruising flight.
Figure 11B:
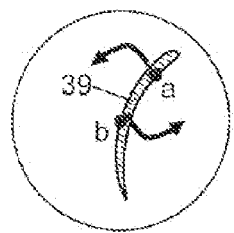
FIG. 11b is an enlarged view of a detail in FIG. 11a, FIG. 12 and its detail in FIG. 12a are respectively similar to FIGS. 11a and 11b, for a variant embodiment comprising a plurality of longitudinal deflecting vanes according to a second example of the second embodiment of the device of the invention.
Figure 11C:
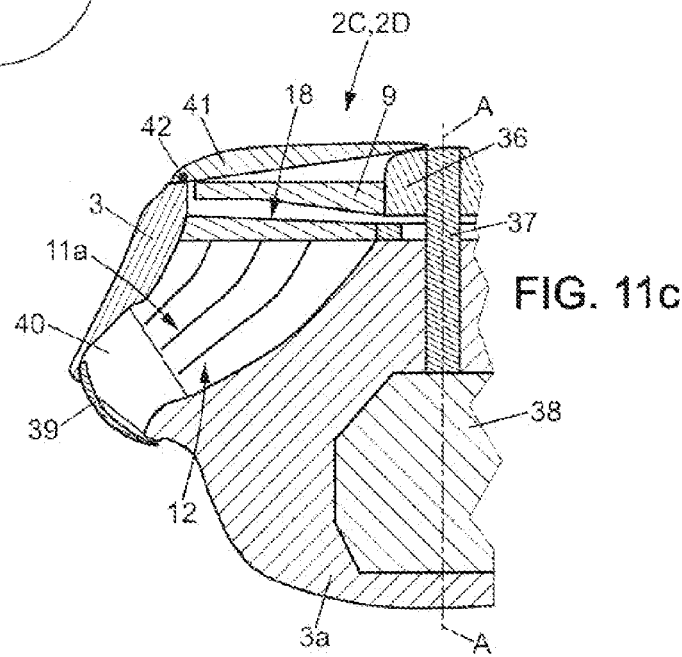

For the same purpose, the vane 39 mounted in the outlet opening 14 common to the curved channels 12 of all the semi-distributors 11a on the same side of the heavier-than-air aircraft can be pivoted, as shown in FIGS. 11a and 11c, so as to completely close the outlet opening 14, and thus improve the aerodynamics of the heavier-than-air aircraft in cruising flight.

The detail of FIG. 11a represented in FIG. 11b shows that the profiled curved vane 39 can pivot by its upstream portion, substantially inside the common outlet manifold 40 where this upstream portion extends in normal operating position in vertical flight, towards and against the inner face of the outer and lower edge of the load-bearing structure 3 that delimits the upper edge of the outlet opening 14, while the downstream portion of the vane 39, normally projecting outside the outlet manifold 40 and directed substantially downwards, can pivot towards the load-bearing structure 3 in its portion delimiting the inner and lower edge of the outlet opening 14, in order to adopt the closed position shown in FIG. 11c.

Of course, in order to ensure the lift of the aircraft in cruising flight, the heavier-than-air aircraft is fitted with lift-generating wings, for example wings such as rear 5 and front 6 transverse aerofoils of the heavier-than-air aircraft in FIGS. 1a and 1b, or front and rear high transverse wings that are conventionally fitted to many aircraft, and the propulsion is provided using at least one propulsive propeller or at least one propulsive or thermopropulsion turbine (not shown). FIG. 14 shows diagrammatically a high wing 44, extending laterally towards the outside of the load-bearing structure 3, at the level of its longitudinal upper edges, which can have, in plan view, a conventional transverse shape, or a triangular, delta or double-delta shape, with an upturned outer wingtip forming a fin against wingtip vortices.

In this case, the covers 41 and the vanes 39 pivot, or more generally move, from their respective open, jet deflection position in FIG. 11a, for vertical flight, to their closed position in FIG. 11c, for cruising flight, from the moment when the heavier-than-air aircraft has reached a horizontal speed sufficient to be borne by its transverse wings.

It must be noted that the profiled vane 39, which can pivot about two points a and b as indicated in FIG. 11b, can also be used to twist its profile, by a differential pivoting along the vane 39, so as to modulate its lift over its length in order to balance the heavier-than-air aircraft about the pitch axis Y and roll axis X.

Figure 13:
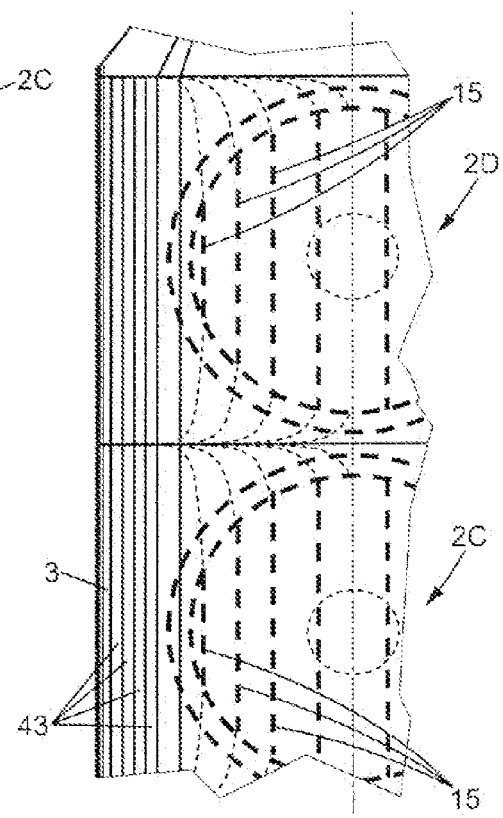
FIG. 13 is a diagrammatic bottom view of a portion with two fans of the heavier-than-air aircraft showing the longitudinal continuity of the longitudinal deflecting vanes of said plurality of vanes, in bold lines, and the boundary of the deflecting partitions in faint dotted lines, in which the multi-blade rotors and rectifiers of the fans are not shown for the sake of clarity.

The same provisions can be adopted in the variant embodiment shown in FIGS. 12 and 13, in which a plurality of profiled curved longitudinal deflecting vanes is installed in place of the single vane 39 in FIGS. 8 to 11c, in the outlet manifold 40 common to all the semi-distributors 11a on the same side of the heavier-than-air aircraft, and equal in number to the fans such as 2C and 2D used. This plurality of vanes 43 comprises a minimum of two vanes 43, but preferably comprises four or more.

Figure 12A:
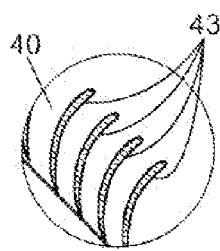

By way of example, in FIG. 12 and in its detail in FIG. 12a, four profiled curved longitudinal vanes 43 are spaced apart and offset from one another respectively from outside to inside and from top to bottom with respect to the load-bearing structure 3, and extend in the common outlet manifold 40 so that their trailing edges are all situated substantially in the plane of the outlet opening 14 common to the different curved ducts 12 on the same side of the heavier-than-air aircraft. As in the example in FIGS. 8 and 9, the concavity of the four longitudinal vanes 43 is facing in the opposite direction to that of the curved partitions 15 of the semi-distributors 11a of the same side, so that the half-flows leaving the fans 2C and 2D that pass through the corresponding curved ducts 12 are firstly progressively guided laterally outwards by the partitions 15 then channeled downwards by the profiled longitudinal deflecting vanes 43 in order to generate a lift force of the heavier-than-air aircraft.

FIG. 12 also shows a moveable closing cover 41, here also pivoting about a longitudinal axis 42, for closing the halves of the fans 2C and 2D of the same side, and the vanes 43 can also all be pivoted about a respective longitudinal axis in order to be applied one against another in a herringbone pattern that closes the longitudinal outlet opening 14 to the curved outlet ducts 12 of this same side of the heavier-than-air aircraft.

FIG. 13 is a bottom view of a portion of the two fans 2C and 2D with a plurality of longitudinal vanes 43. As in FIGS. 12 and 12a, it will be noted that the longitudinal extent of these vanes 43 is clearly visible in FIG. 13 and that they extend over the whole length of the fans used. In FIG. 13, as in FIG. 10, for greater clarity, the rotors of the fans and the rectifiers or distributor-deflectors have not been shown, and the boundary of the curved partitions 15 in the two curved ducts 12 situated on this same side are marked with faint dotted lines.

Figure 16:
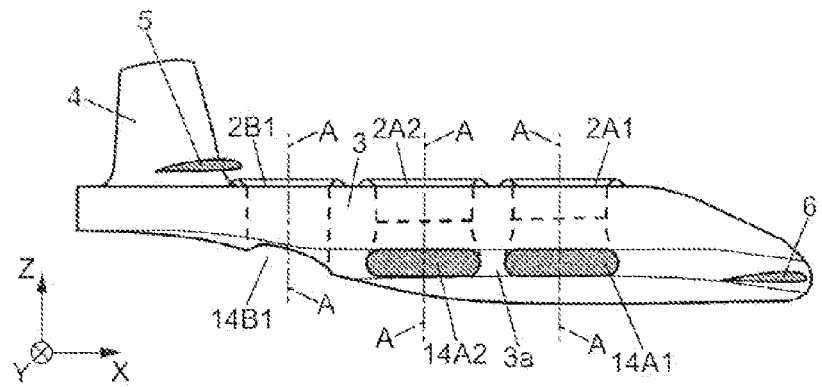
FIG. 16 is a diagrammatic profile view of a variant of the heavier-than-air aircraft according to the invention, with several axial fans, including at least one vertically through-mounted fan fitted with a lift-generating device according to the invention, at the level of axial fans that are not through-mounted, the air flow channels of the various fans being shown in dotted lines.

FIG. 16 shows a variant heavier-than-air aircraft according to the invention in a diagrammatic profile view, with the flow paths and air flow channels of the axial fans shown in dotted lines. The heavier-than-air aircraft is fitted with a plurality of axial fans, each of which has its axis of rotation AA parallel with the yaw axis Z of the heavier-than-air aircraft, and these axes AA extend in the median plane of symmetry of the heavier-than-air aircraft that is defined by the roll axis X and yaw axis Z, and which in the normal configuration of the heavier-than-air aircraft is a vertical plane corresponding to the plane of FIG. 16. The axial fans of the plurality of fans of the aircraft are thus arranged one behind another, from the front to the rear of the heavier-than-air aircraft, and all centred in the aforementioned median plane of symmetry. This plurality of axial fans comprises at least two fans of the type previously described, in which each fan is associated with an air distributor-diffuser 11, as described above, and at least one fan of a different type, which is a through-mounted fan or with an axial flow outlet, i.e. the flow path of which delimited by its fairing passes through the structure 3 of the heavier-than-air aircraft parallel with its axis AA and from the upper face to the lower face of the structure 3, vertically in normal configuration of the heavier-than-air aircraft. As already explained, the first type is an axial fan with lateral flow outlets from the associated distributor-diffuser, or not through-mounted, i.e. with a circular inlet or intake opening in the upper face of the structure 3 and a flow path subdivided into two by a distributor such as described above, with two semi-distributors each of which guides half of the air flow from the fan to respectively one of two openings or lateral outlet sections at the downstream end of a corresponding curved duct, the outlet sections each opening onto respectively one of the two lateral sides of the structure 3 and cooperating with one or more profiled curved longitudinal deflecting vanes deflecting the outlet flows downwards, as previously described. In the example shown in FIG. 16, the front mid portion of the heavier-than-air aircraft is thus fitted with a series limited to two non through-mounted axial fans 2A1 and 2A2, each associated with two lateral outlet openings or sections 14A1 and 14A2 of the corresponding distributor-diffuser and symmetrical to one another on the sides of the structure 3. These fans 2A1 and 2A2 can be associated with specific outlet openings 14A1 and 14A2, fitted with profiled curved longitudinal deflecting vanes such as 39 in FIGS. 8, 9 and 11a to 11c or such as 43 in FIGS. 12 and 12a, and which are specific to each outlet opening 14, or outlet openings 14 form part of the definition of a longitudinal outlet manifold 40, on each side of the heavier-than-air aircraft, and common to all the axial fans of this type and of this first series, with profiled curved deflecting vanes 39 or 43 extending longitudinally in the common outlet manifolds 40 as in FIGS. 10 and 13.

The plurality of non through-mounted axial fans of the heavier-than-air aircraft is supplemented by an axial fan 2B1, through-mounted or with an axial flow outlet, installed at the rear of the fan 2A2, between the latter and a vertical stabilizer 4 of a rear empennage that can also comprise a transverse aerofoil 5, arranged in a known manner, in a fixed plane adjustable about an axis parallel with the pitch axis Y, forming a stabilizer, for adjusting the attitude of the heavier-than-air aircraft, at the front, and partially at the rear, in a surface that can be oriented by pivoting about a transverse axis in order to act as an elevator, the stabilizer 4 also being able to include a part that can be oriented about an axis parallel with the yaw axis Z, in order to stabilize the heavier-than-air aircraft in forward flight and to act as a rudder. At the front of the heavier-than-air aircraft, the structure 3 supports a transverse front aerofoil 6 which, as in the example heavier-than-air aircraft in FIGS. 1A and 1B, can be of the canard type and comprise two aerofoil elements each projecting on respectively one of the two sides of the nacelle 3a of the structure 3, each of the aerofoil elements being controlled in orientation about a transverse axis, in a known manner. For propulsion, the aircraft can include in addition at least one propulsive turbine or at least one propulsive propeller, not shown.

The through-mounted fan 2B1, or each of the fans of this type fitted to the heavier-than-air aircraft, has an outlet opening 14B1 that is in the vertical extension of the inlet of this fan 2B1, and has an outlet section that is equal to, or preferably slightly greater than, by 10 to 30%, the inlet section, in the upper face of the structure 3. Each through-mounted fan such as 2B1 can advantageously include a flow rectifier such as 18 described above (with reference to FIG. 3a in particular) downstream of a multi-blade rotor such as 9, or two contra-rotating rotors such as 9 and 9', as described above (in particular with reference to FIG. 3b), as can also be the case of each of the non through-mounted fans 2A1 and 2A2, preferably identical to one another. The through-mounted fan or fans such as 2B1 can be driven in rotation by the same mechanical drive system as the non through-mounted fans such as 2A1 and 2A2.

In particular, at least one of the axial fans 2A1, 2A2 and 2B1, and preferably the latter, or all the through-mounted axial fans (or fans with axial flow outlets) of the heavier-than-air aircraft is or are if applicable fitted with a rotor or a propeller with variable-pitch and adjustable blades, or, if applicable, two contra-rotating rotors or propellers with variable-pitch and adjustable blades, and this or these variable-pitch propeller(s) or rotor(s) is or are driven in rotation at a constant nominal speed. Thus, if all the axial fans, non through-mounted such as 2A1 and 2A2 and through-mounted such as 2B1 are driven by a drive system with fixed drive ratios, the thrust of at least one axial fan with variable-pitch propeller or rotor is adjustable by controlling the pitch of this or these propellers or rotors, in order to contribute to balancing the attitude of the aircraft.

In addition, both types of fan, through-mounted and non through-mounted, can be fitted with closing covers in cruising flight, such as the moveable covers 41, shown for example pivoting in FIGS. 11a and 11c, and described with reference to these figures, these covers not being shown in FIG. 16.

As a variant (not shown), the heavier-than-air aircraft can include one or more "through-mounted" axial fans (or with a vertical axial flow outlet) at the front and/or at the rear of the axial fans each associated with an air distributor-diffuser with lateral outlets.

Figure 17A:
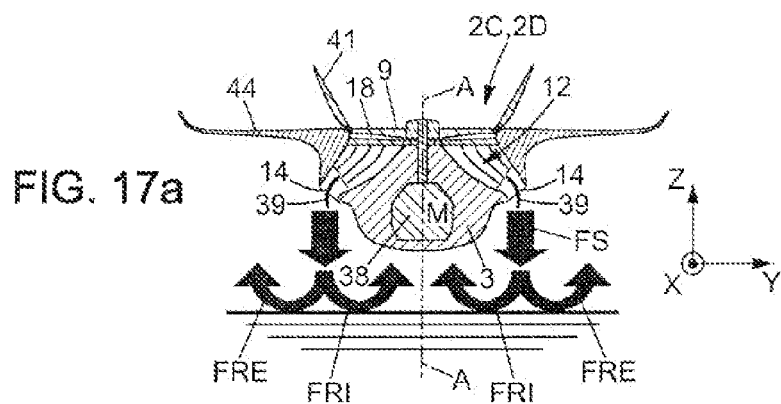
FIGS. 17a and 17b are similar transverse cross-sectional diagrammatic views of other variants of heavier-than-air aircraft according to the invention, fitted with a lift-generating device according to FIG. 14 with outlet air flows, oriented by longitudinal deflecting surfaces, which are respectively vertical (in FIG. 17a) or directed slightly outwards from each side of the heavier-than-air aircraft (in FIG. 17b)

FIG. 17a shows a diagrammatic cross-section, in a plane parallel with the plane defined by the pitch axis Y and the yaw axis Z, of another variant heavier-than-air aircraft according to the invention, fitted with a lift-generating device according to FIG. 14 described above. In this variant, the air flows leaving the outlet openings 14 of the curved ducts 12 of the two semi-distributors downstream of the multi-blade rotor 9 and the rectifier 18 of each of the two axial fans 2C, 2D are deflected by the profiled curved longitudinal deflecting vanes 39 so as to be oriented strictly vertically downwards, as indicated by the arrows FS. In this case, on vertical takeoff or vertical landing of the heavier-than-air aircraft, each of the outlet flows FS is sent back upwards by the ground and is divided into an outer return flow FRE and an inner return flow FRI, as indicated by the arrows in FIG. 17a, and the two inner return flows FRI are sent back towards the lower portion of the structure 3 of the heavier-than-air aircraft, and, by this lower portion, towards the outlet flows FS, which causes instationary interactions between the outlet flows FS, the structure 3 of the heavier-than-air aircraft and the inner return flows FRI, which give rise to significant instabilities which are difficult to manage, and are known as the "ground effect".

Figure 17B:
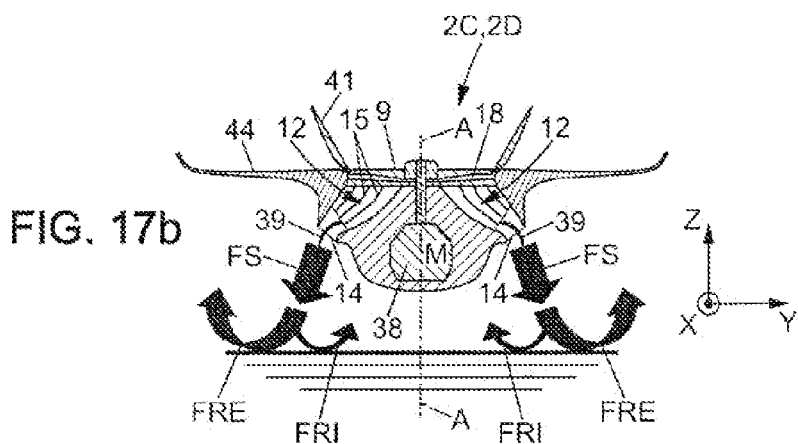

For this reason, it is particularly advantageous, as shown in the variant heavier-than-air aircraft in FIG. 17b, to modify the orientation of the deflecting vanes 39, as well as optionally the geometry and orientation of the outlet openings 14 and the deflecting partitions 15 of the two curved ducts 12 so that, on each side of the heavier-than-air aircraft, the outlet flow FS, along the arrows in FIG. 17b, is directed slightly outwards from the corresponding side with respect to the median plane of symmetry of the heavier-than-air aircraft that includes the axes AA of the fans 2C, 2D. Thus, the fractions of the outlet flows that constitute the inner return flows FRI are much smaller than those constituting the outer return flows FRE, so that the ground effect on the structure 3 of the heavier-than-air aircraft is considerably reduced. With respect to the vertical median plane of symmetry of the heavier-than-air aircraft that includes the axes AA of the fans, the angle of downward and outward inclination of the outlet flow FS is comprised between approximately 5° and approximately 20°, and preferably between approximately 8° and approximately 12°, being the same on each side. Another advantage of this orientation is that, in the case of unintended roll of the heavier-than-air aircraft about the axis X, the ground effect will tend to right the heavier-than-air aircraft, since roll has the effect of increasing the angle of inclination on one side and reducing it on the other, and therefore creating an anti-roll reaction, through the ground effect, on the side of the reduced angle of inclination, so that a rotational force will be applied to the heavier-than-air aircraft about the roll axis X, tending to return the two inclinations towards their initial, equal value. The slight outward orientation of each outlet flow FS that is proposed has no particular effect on the lift generation, because the resulting loss of vertical thrust is very small, of the order of 1% for angles of lateral deflection of the order of 10°.

FIG. 18 shows a similar view to FIG. 14 of another variant heavier-than-air aircraft according to the invention, making it possible to optimize the front section of the heavier-than-air aircraft, for a given fan section, or conversely, to optimize the section of the fan or fans of a heavier-than-air aircraft, i.e. to make it as large as possible, for a given front section of the heavier-than-air aircraft.

To this end, at the level of the fairing of each fan 2C or 2D surrounding the rotor 9 the vanes 19 of the rectifier 18, or, if applicable, the two contra-rotating rotors 9 and 9', the flow path 10 and also the rotor 9 or the rotors 9 and 9' of each fan 2C or 2D have a radius (measured from the axis of rotation AA of the fan) that is greater than the distance between the median plane of the heavier-than-air aircraft including the axis AA (and defined by the roll axis X and the yaw axis Z) and the low point 14a of the inlet opening 14 each side of the heavier-than-air aircraft, i.e. the inner and lower edge of each outlet opening 14. This provision makes it possible to have a large section of the fans 2C, 2D without detracting from the front section of the heavier-than-air aircraft. As for the rest, FIG. 18 shows the members and elements already described above with reference to FIG. 14, and labelled with the same numerical references, another difference being that, in FIG. 18, two profiled curved longitudinal deflecting vanes 39 are mounted in the outlet opening 14.

It should be noted that the fan or fans and optionally, one or more propellers or turbines for propulsion in cruising flight can be driven by the same power unit 38. As at least two fans are used, they are preferably driven by a single drive shaft connected to the power unit which, for cruising flight propulsion, can also, if applicable, drive at least one disengageable propeller or propulsive turbine. In contrast, in the case of a second engine driving at least one propeller or propulsive turbine for cruising flight, this second engine can act as an emergency engine and can also be connected to the drive shaft of the fans.

This results in economies of weight and fuel consumption with respect to the number of fans and the air flow generated.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A lift-generating device for a vertical- or short-takeoff heavier-than-air aircraft, using the lift-generating effect obtained by blowing a majority of an air flow produced by an air flow generator over deflecting surfaces linked to a load-bearing structure, the device comprising two longitudinal deflecting surfaces, arranged on either side of a roll axis of the device and extending substantially parallel with said roll axis, said two longitudinal deflecting surfaces being symmetrical with one another with respect to a plane defined by said roll axis and a yaw axis of the device, said air flow generator comprising at least two axial fans having axes which are substantially parallel with said yaw axis, and mutually offset on said roll axis, said axial fans being mounted in said load-bearing structure, and each drawing ambient air via a respective intake opening arranged in an upper face of said load-bearing structure, using at least one multi-blade rotor driven in rotation about an axis of a corresponding axial fan and faired in a flow path with a circular cross-section extending said inlet opening towards an inside of said load-bearing structure, wherein said at least two axial fans each comprise at least two stages having pluralities of blades, one of which is said multi-blade rotor mobile in rotation about the corresponding axis, and the lift-generating device comprises, downstream of each of said at least two axial fans, an air distributer-diffuser, consisting of two adjacent semi-distributors, symmetrical with one another with respect to a plane defined by said axis of said corresponding axial fan and said roll axis, each semi-distributor delimiting a curved duct having an inlet opening receiving one of two halves of the air flow leaving said corresponding axial fan, on a side of respectively one of said two longitudinal deflecting surfaces, and guiding the air that passes through said curved duct to an outlet opening incorporated in respectively one of two lateral faces of said load-bearing structure by means of a plurality of channels extending at least over a portion of a length of said curved duct and delimited by deflecting partitions formed by generatrices parallel with said roll axis, and towards said longitudinal deflecting surface situated on a same side as said semi-distributor, so that an air flow drawn in by each said axial fan is divided into two halves, the majority of each of which is laterally blown over respectively one of said two longitudinal deflecting surfaces.

2. The device according to claim 1, comprising successively, from a front to a rear of said load-bearing structure, and centred in a plane of symmetry defined by said roll and yaw axes of the device, a series of said at least two axial fans each cooperating with an air distributor-diffuser, followed or preceded by at least one axial fan with an axial flow outlet, the flow of which passes through said load-bearing structure from top to bottom.

3. The device according to claim 2, wherein said axial fan with an axial flow outlet has an axis parallel with said yaw axis and has an outlet section situated in the vertical extension of an inlet section, with a ratio between said outlet section and said inlet section that is greater than 1.

4. The device according to claim 2, wherein at least one axial fan is fitted with a least one propeller having variable-pitch and adjustable blades, and driven in rotation at a constant nominal speed.

5. The device according to claim 4, wherein all said axial fans are driven by a drive system with fixed drive ratios, and a thrust of at least one axial fan with variable-pitch propeller is adjustable by controlling the pitch, in order to contribute to balancing the attitude of the device.

6. The device according to claim 1, wherein an air flow generated by each axial fan with air distributor-diffuser is directed to each side of said load-bearing structure with an outward angular orientation, an angle between the direction of said flow and a plane defined by said roll and yaw axes of the device being situated between 5° and 20°.

7. The device according to claim 1, wherein a radius of at least one axial fan with air distributor-diffuser is greater than a distance between a low point of said outlet opening of said air flow of said air distributor-diffuser, and a median plane of symmetry of the device, defined by said roll and yaw axes of the device.

8. The device according to claim 1, wherein at least one portion of said longitudinal deflecting surfaces extends longitudinally in a substantially parallel fashion to said roll axis over a length greater than or equal to the sum of diameters of said fans with distributor-diffuser.

9. The device according to claim 1, wherein at least one axial fan comprises two multi-blade rotors that are coaxial and contra-rotating about a common axis.

10. The device according to claim 1, wherein on at least one axial fan with distributor-diffuser, a flow rectifier is mounted between said at least one multi-blade rotor and said air distributor-diffuser, said rectifier including a plurality of fixed vanes, which rectify an air flow at said outlet of said fan substantially parallel with said axis of said axial fan, said fixed vanes extending radially between an annular hub through which at least one drive shaft of said at least one multi-blade rotor passes, and a circular peripheral rim, coaxial with said annular hub about said axis of said fan and fixed to said load-bearing structure.

11. The device according to claim 1, wherein, on at least one axial fan with distributor-diffuser, a flow distributor-deflector is mounted upstream, above said at least one multi-blade rotor, said flow distributor-deflector including a plurality of radial fixed vanes, which deflect an air flow at an inlet of said axial fan so that the sum of deflected flows due to the presence of said distributor-deflector and said at least one multi-blade rotor is substantially zero so that the air flow has an orientation substantially parallel with said axis of said axial fan, at said outlet of said axial fan.

12. The device according to claim 1, wherein an area of the cross-section of said curved duct, perpendicular to a local direction of flow of air in said curved duct, is substantially constant so that a ratio of said area of the cross-section of said outlet opening to an area of the section of said inlet opening is comprised between substantially 1 and substantially 2.

13. The device according to claim 1, wherein a shape of the cross-section of said curved duct develops progressively from a semi-circular shape at said inlet opening, in a plane substantially perpendicular to said axis of the corresponding fan, to a substantially ovoid shape in a direction substantially parallel with said roll axis, at said outlet opening, in a plane substantially parallel with said axis of said fan on said axis of said fan.

14. The device according to claim 1, wherein a shape of said outlet opening of said curved duct is substantially rectangular.

15. The device according to claim 1, wherein said curved duct is made up, between a semi-circular inlet opening and said outlet opening, of a curved upstream portion the cross-sections of which are substantially semi-elliptical, and comprising said plurality of deflecting partitions for guiding the air flow passing through said duct, and a downstream portion, without a deflecting partition, and substantially straight between a last, substantially semi-elliptical section, of said upstream portion and said outlet opening.

16. The device according to claim 1, wherein said two longitudinal deflecting surfaces are longitudinal lift-generating aerofoils fixed laterally outside said load-bearing structure and each facing said outlet opening of said curved duct of respectively one of said two semi-distributors so that a majority of the air flow passing through said curved duct is blown over a facing one of said longitudinal aerofoils, which delivers a lift transmitted to said load-bearing structure.

17. The device according to claim 16, wherein said curved duct has cross-sections the shape of which develops progressively, from said semi-circular inlet opening, in semi-ellipses elongated along their long axis, which is parallel with said roll axis, to a semi-ellipse of longer axis at said outlet opening.

18. The device according to claim 17, wherein said long axis of said semi-ellipse of said outlet opening is comprised substantially between 1.2D and 1.5D, where D is the diameter of the section of said inlet opening.

19. The device according to claim 16, wherein said outlet opening of said curved duct opens out at the level of blow vents arranged in a longitudinal side of said load-bearing structure opposite said facing one of said longitudinal aerofoils.

20. The device according to claim 19, wherein streamlined ribs with a cross-section in the shape of a wedge extend along at least one of upper and lower edges of said blow vents of said longitudinal aerofoils and project towards said aerofoils so as to draw ambient air through a lateral blow flow outlet via said vents and dilute said flow, while reducing the pressure losses at an outlet of the vents.

21. The device according to claim 19, wherein the outlet flow from said vents is inclined downwards, with respect to a plane perpendicular to said axis of said fan, at an angle comprised between 0° and approximately 60°.

22. The device according to claim 19, wherein each of said longitudinal aerofoils is made up of a longitudinal wing having a leading edge which is immediately adjacent to said lower edge of said blow vents in a corresponding longitudinal side of said load-bearing structure, so as to blow over an upper surface of said longitudinal aerofoil and generate a Coandă effect lift.

23. The device according to claim 16, wherein each curved duct comprises a cloth sheath shaped by composite stiffeners in the form of battens, forming a sheath inlet frame with a semi-circular hoop, a sheath outlet frame substantially rectangular in shape, curved stiffeners being connected to said inlet and outlet frames and oriented in the direction of an air flow passing through said curved duct, and at least one curved deflecting partition defined by generatrices parallel with said roll axis.

24. The device according to claim 1, wherein said two longitudinal deflecting surfaces are aerodynamically profiled deflecting vanes, mounted at least partially inside said curved ducts of said semi-distributors downstream of said deflecting partitions, said deflecting vanes being defined by generatrices parallel with said roll axis, curved and having their concavity facing downwards and inwards, on the side of said load-bearing structure, so as to deflect an air flows passing through said curved ducts downwards, in order to generate a lift force on said load-bearing structure by reaction.

25. The device according to claim 24, wherein said curved ducts, partitions and curved deflecting vanes are arranged and dimensioned so that a majority of each half-flow from each corresponding fan is laterally offset with respect to said roll axis, by a distance greater than or equal to the radius of said fan.

26. The device according to claim 24, wherein a longitudinal deflecting vane is associated with said curved ducts of said semi-distributors which are on a same side of said load-bearing structure, an upstream portion of said deflecting vane being engaged inside an outlet manifold common to all said curved ducts of said same side, downstream of said deflecting partitions, and a downstream portion of said deflecting vane projecting outside said outlet manifold and oriented substantially downwards.

27. The device according to claim 24, wherein a plurality of longitudinal deflecting vanes, spaced apart and offset from one another respectively from the outside in and from top to bottom with respect to said load-bearing structure, is associated with said curved ducts of said semi-distributors which are on a same side of said load-bearing structure, and totally engaged inside an outlet manifold common to all said curved ducts of said same side, downstream of said deflecting partitions, substantially from the outlet end of said manifold in which said downstream ends of said vanes are substantially arranged.

28. The device according to claim 26, wherein at least one longitudinal deflecting vane is pivotably mounted about at least one longitudinal axis substantially parallel with said roll axis, between two end positions, one of which is an operating position, in which an air flow passing through said corresponding curved ducts is deflected downwards, and a closed position of said outlet opening of said curved ducts for cruising flight.

29. The device according to claim 1, wherein a diameter of said fans parallel with said pitch axis extends over a majority of a width of said load-bearing structure, and is more than 80% of said width.

30. The device according to claim 1, wherein vibrating membrane strips are arranged parallel with said roll axis on an upper surface of one at least of said deflecting partitions and said deflecting surfaces so as to reduce turbulence of an air flow passing over at least one of said deflecting partitions and said deflecting surfaces.

31. The device according to claim 1, wherein, on the one hand, a cross-section of each individual channel delimited by two successive deflecting partitions remains substantially constant over the whole length of said channel, while an air flow passes through the area of said partitions, and that, on the other hand, the ratio of each cross-section of an individual channel to a lateral surface of said individual channel remains substantially equivalent between all said channels delimited by said partitions.

32. The device according to claim 1, wherein at least one closing cover is mounted on an upper portion of said load-bearing structure, moveable between two positions, an open position in which at least one fan is open in vertical flight configuration, and a closed position of said at least one fan, in which said cover covers said at least one fan for cruising flight.

33. The device according to claim 1, wherein a continuous volume, at least partially dedicated to a payload, is arranged at least below and between said at least two axial fans with air distributor-diffuser.

34. A vertical- or short-take-off and landing heavier-than-air aircraft comprising a load-bearing structure supporting a lift-generating device comprising two longitudinal deflecting surfaces, arranged on either side of a roll axis of the device and extending substantially parallel with said roll axis, said two longitudinal deflecting surfaces being symmetrical with one another with respect to a plane defined by said roll axis and a yaw axis of the device, said air flow generator comprising at least two axial fans having axes which are substantially parallel with said yaw axis, and mutually offset on said roll axis, said axial fans being mounted in said load-bearing structure, and each drawing ambient air via a respective intake opening arranged in an upper face of said load-bearing structure, using at least one multi-blade rotor driven in rotation about an axis of a corresponding axial fan and faired in a flow path with a circular cross-section extending said inlet opening towards an inside of said load-bearing structure, wherein said at least two axial fans each comprise at least two stages having pluralities of blades, one of which is said multi-blade rotor mobile in rotation about the corresponding axis, and the lift-generating device comprises, downstream of each of said at least two axial fans, an air distributer-diffuser, consisting of two adjacent semi-distributors, symmetrical with one another with respect to a plane defined by said axis of said corresponding axial fan and said roll axis, each semi-distributor delimiting a curved duct having an inlet opening receiving one of two halves of the air flow leaving said corresponding axial fan, on a side of respectively one of said two longitudinal deflecting surfaces and guiding the air that passes through said curved duct to an outlet opening incorporated in respectively one of two lateral faces of said load-bearing structure by means of a plurality of channels extending at least over a portion of a length of said curved duct and delimited by deflecting partitions formed by generatrices parallel with said roll axis, and towards said longitudinal deflecting surface situated on a same side as said semi-distributor, so that an air flow drawn in by each said axial fan is divided into two halves, the majority of each of which is laterally blown over respectively one of said two longitudinal deflecting surfaces.

35. The heavier-than-air aircraft according to claim 34, wherein said device is supported in an upper portion of said load-bearing structure, which is arranged in a lower portion as a nacelle housing an engine and supporting at least one of a transverse, triangular or delta front aerofoil, a rear aerofoil and an aerofoil that is arranged between said two longitudinal deflecting surfaces or pluralities of surfaces of said device.

36. The heavier-than-air aircraft according to claim 34, wherein said device is supported in an upper portion of said load-bearing structure, which is arranged in a lower portion as a nacelle housing an engine and supporting at least one wing extending in the lateral extension of said load-bearing structure and immediately above said lateral outlet openings of said curved ducts of said air distributor-diffusers.

37. The heavier-than-air aircraft according to claim 34, comprising a number of fans mainly fitted with contra-rotating propellers and without a flow rectifier.

\* \* \* \* \*